US012452613B2

(12) United States Patent
Thielen et al.

(10) Patent No.: US 12,452,613 B2
(45) Date of Patent: Oct. 21, 2025

(54) METHOD OF SEPARATING EAR CANAL WALL MOVEMENT INFORMATION FROM SENSOR DATA GENERATED IN A HEARING DEVICE

(71) Applicant: Sonova AG, Staefa (CH)

(72) Inventors: Anne Thielen, Stäfa (CH); Konstantin Silberzahn, Zürich (CH)

(73) Assignee: Sonova AG, Staefa (CH)

( * ) Notice: Subject to any disclaimer, the term of this patent is extended or adjusted under 35 U.S.C. 154(b) by 314 days.

(21) Appl. No.: 18/211,924

(22) Filed: Jun. 20, 2023

(65) Prior Publication Data

US 2024/0015450 A1 Jan. 11, 2024

(30) Foreign Application Priority Data

Jul. 5, 2022 (EP) .................................... 22183061

(51) Int. Cl.
*H04R 25/00* (2006.01)
*H04R 1/10* (2006.01)

(52) U.S. Cl.
CPC ......... *H04R 25/505* (2013.01); *H04R 1/1041* (2013.01); *H04R 25/65* (2013.01)

(58) Field of Classification Search
CPC ............ A61B 2562/185; A61B 5/0059; A61B 5/6817; H04R 25/603; H04R 1/1041; H04R 2225/0216; H04R 25/505; H04R 25/65; H04R 1/1016; H04R 1/1075; H04R 25/604; H04R 25/609; H04R 25/652
USPC .......................................................... 381/312
See application file for complete search history.

(56) References Cited

U.S. PATENT DOCUMENTS

| | | | |
|---|---|---|---|
| 8,788,002 | B2 | 7/2014 | Leboeuf et al. |
| 10,638,210 | B1 | 4/2020 | El Guindi et al. |
| 10,728,676 | B1 | 7/2020 | El Guindi et al. |
| 10,798,499 | B1 | 10/2020 | El Guindi et al. |
| 11,115,762 | B2 | 9/2021 | Sigwanz et al. |

(Continued)

FOREIGN PATENT DOCUMENTS

| | | | |
|---|---|---|---|
| EP | 3684079 | A1 | 7/2020 |
| EP | 3883260 | A1 | 9/2021 |

OTHER PUBLICATIONS

"Extended European Search Report for Application No. EP22183061.5 mailed on Dec. 13, 2022".

*Primary Examiner* — Phylesha Dabney
(74) *Attorney, Agent, or Firm* — ALG Intellectual Property, LLC

(57) ABSTRACT

A method of processing sensor data generated in a hearing device is disclosed, the hearing device comprising a BTE housing configured to be worn behind an ear of a user and an ITE housing configured to be at least partially inserted into an ear canal of the ear. The method may include receiving, from a movement sensor included in the BTE housing, BTE housing movement data indicative of movements of the BTE housing; receiving, from an ear canal sensor included in the ITE housing, ear canal sensor data affected by movements of an ear canal wall, characterized by determining a correlation between the BTE housing movement data and at least part of the ear canal sensor data; and separating, based on the correlation, information about movements of the ear canal wall relative to the BTE housing from at least part of the ear canal sensor data.

15 Claims, 5 Drawing Sheets

(56) References Cited

U.S. PATENT DOCUMENTS

| | | | | |
|---|---|---|---|---|
| 2010/0172523 | A1 | 7/2010 | Burns et al. | |
| 2019/0174237 | A1* | 6/2019 | Lunner | H04R 1/1041 |
| 2019/0231253 | A1 | 8/2019 | Ahmed et al. | |
| 2021/0092530 | A1 | 3/2021 | Thomsen et al. | |
| 2021/0099811 | A1* | 4/2021 | Roeck | G10K 11/17873 |
| 2021/0360354 | A1 | 11/2021 | Rasmussen et al. | |
| 2022/0159389 | A1 | 5/2022 | Lawrence et al. | |
| 2022/0225887 | A1* | 7/2022 | Goldman | A61B 5/318 |

* cited by examiner

METHOD OF SEPARATING EAR CANAL WALL MOVEMENT INFORMATION FROM SENSOR DATA GENERATED IN A HEARING DEVICE

RELATED APPLICATIONS

The present application claims priority to EP Patent Application No. 22183061, filed Jul. 5, 2022, the contents of which are hereby incorporated by reference in their entirety.

TECHNICAL FIELD

The disclosure relates to a method of processing sensor data generated in a hearing device comprising a BTE housing configured to be worn behind an ear of the user and an ITE housing configured to be at least partially inserted into an ear canal of the ear.

BACKGROUND INFORMATION

Hearing devices may be used to improve the hearing capability or communication capability of a user, for instance by compensating a hearing loss of a hearing-impaired user, in which case the hearing device is commonly referred to as a hearing instrument such as a hearing aid, or hearing prosthesis. A hearing device may also be used to output sound based on an audio signal which may be communicated by a wire or wirelessly to the hearing device. A hearing device may also be used to reproduce a sound in a user's ear canal detected by a microphone. The reproduced sound may be amplified to account for a hearing loss, such as in a hearing instrument, or may be output without accounting for a hearing loss, for instance to provide for a faithful reproduction of detected ambient sound and/or to add sound features of an augmented reality in the reproduced ambient sound, such as in a hearable. A hearing device may also provide for a situational enhancement of an acoustic scene, e.g. beamforming and/or active noise cancelling (ANC), with or without amplification of the reproduced sound. A hearing device may also be implemented as a hearing protection device, such as an earplug, configured to protect the user's hearing. Different types of hearing devices configured to be worn at an ear include earbuds, earphones, hearables, and hearing instruments such as receiver-in-the-canal (RIC) hearing aids, behind-the-ear (BTE) hearing aids, in-the-ear (ITE) hearing aids, invisible-in-the-canal (IIC) hearing aids, completely-in-the-canal (CIC) hearing aids, cochlear implant systems configured to provide electrical stimulation representative of audio content to a user, a bimodal hearing system configured to provide both amplification and electrical stimulation representative of audio content to a user, or any other suitable hearing prostheses. A hearing system comprising two hearing devices configured to be worn at different ears of the user is sometimes also referred to as a binaural hearing device. A hearing system may also comprise a hearing device, e.g., a single monaural hearing device or a binaural hearing device, and a user device, e.g., a smartphone and/or a smartwatch, communicatively coupled to the hearing device.

Different types of hearing devices can also be distinguished by the position at which they are intended to be worn at an ear of the user. Some types of hearing devices, such as a RIC hearing aid, include a behind-the-ear housing (BTE housing) configured to be worn at a wearing position behind the ear of the user, which can accommodate functional components of the hearing device. Other functional components of the hearing device, which are intended to be placed at a position close to or inside an ear canal of the ear, can be accommodated in an in-the-ear housing (ITE housing) configured to be at least partially inside the ear canal, e.g., an earpiece housing adapted for an insertion and/or a partial insertion into the ear canal. For instance, a RIC hearing aid normally comprises a receiver configured to generate sound enclosed by the in-the-ear housing configured to output the generated sound into the ear canal.

More recently, hearing devices have been equipped with a movement sensor. The movement sensor can be, for instance, an inertial sensor such as an accelerometer. Movement data provided by the movement sensor can be indicative of a movement of the hearing device and can thus be employed by a processor to identify a movement feature representative of a movement activity carried out by the user wearing the hearing device. For instance, the movement feature can be representative of a head rotation of the user, as disclosed in U.S. Pat. No. 10,798,499 B1, or a walking activity of the user, as disclosed in U.S. Pat. No. 10,638,210 B1, or a manual tapping on the housing carried out by the user, as disclosed in US 2022/0159389 A1, or a change of a pose of the user, for instance between a more upright pose and a more reclined pose, as disclosed in EP 3 684 079 A1, or the user being in a physical resting state corresponding to a high relaxation level, as disclosed in EP 3 883 260 A1, or a periodic movement of the user when listening to music content, as disclosed in U.S. Pat. No. 10,728,676 B1, or vibrations conducted through the user's head caused by a voice activity of the user, as disclosed in U.S. Pat. No. 11,115,762 B2, or movements of the user's head, based on which mandibular movements may be separated from cranial movements of the head, as disclosed in US 2019/0231253 A1. In most applications, the movement sensor is integrated with an earpiece of the hearing device to detect movements inside the ear canal. In some applications, as described, e.g., in EP 3 684 079 A1 and US 2022/0159389 A1, the movement sensor can also be implemented in the BTE housing of a hearing device.

Moreover, hearing devices have been equipped with an ear canal sensor included in the ITE housing, e.g., earpiece, of a hearing device, which can provide ear canal sensor data affected by movements of the ear canal wall. In some applications, the ear canal sensor can be employed for the purpose to obtain information about the ear canal wall movements in order to determine an activity and/or property of the user from the ear canal wall movements. For instance, the ear canal sensor may be a movement sensor allowing to detect vibrations of the ear canal wall based on which a voice activity of the user can be determined, as disclosed in U.S. Pat. No. 11,115,762 B2. As another example, a movement sensor implemented in an earpiece is employed to determine mandibular and cranial motions based on head movements detected by the movement sensor, as disclosed in US 2019/0231253 A1.

In other applications, the information about the ear canal wall movements in the ear canal sensor data can be rather an undesired side effect. For example, the ear canal sensor can be an optical sensor which may be employed to detect photoplethysmography (PPG) data indicative of a property of blood flowing through tissue at the ear canal. The PPG data can be negatively affected by any movements of the user, e.g., walking, head turns, motions of the ear canal wall, and the like, which can produce movement artefacts in the PPG data. To identify and/or remove the movement artefacts in the PPG data, a movement sensor may be additionally included in the earpiece, as disclosed in U.S. Pat. No.

8,788,002 B2. Similarly, sensor data provided by a physiological sensor inserted in the ear canal other than a PPG sensor can be adversely impacted by those motion artefacts. For instance, the physiological sensor may be a bioelectric sensor including an electrode to detect a bioelectric signal in the form of an electrical current or potential generated by a living organism, e.g., an electrocardiogram (ECG) sensor recording an electrical activity of the heart, or an electroencephalography (EEG) sensor detecting an electrical activity of the brain, or an electrooculography (EOG) sensor to measure an electric potential that exists between the front and back of the human eye.

Properly identifying the information about the ear canal wall movements in the ear canal sensor data and/or separating this information from the ear canal sensor data can be rather challenging. In many cases, the ear canal sensor data is not only affected by movements of the ear canal wall, but also by other user movements including any movements of the user's cranium which lead to corresponding displacements of the ear canal wall forming a part of the cranium. For many applications, however, such as the applications mentioned above, it would be useful to distinguish between information about the ear canal wall moving independently from the cranium, and information about the ear canal wall following the movements of the cranium.

A solution to this problem disclosed in US 2019/0231253 A1, which employs a signal processing including a frequency analysis or a statistical feature analysis or machine learning techniques performed on the ear canal sensor data to separate information about different user activities such as listening, speaking or chewing from other user movements. These processing techniques, however, can be rather processing intensive and may cause an undesired delay even when the information about the ear canal wall movements would be needed rather quickly, e.g., to activate an operation of the hearing device depending thereon. For instance, a detection of an own voice activity or a chewing activity or any kind of intrinsic ear canal movements unrelated to cranium movements could be desired rather quickly to activate a dedicated audio processing program or another hearing device functionality intended to be used in such an event, or to promptly activate a dedicated processing mode for the ear canal sensor data specifically optimized for such an event. Further, these processing techniques may also not be highly reliable, e.g., in situations in which various user movements including, e.g., body motions, cranium motions, and intrinsic ear canal motions of similar amplitude and/or frequency take place. Thus, it is desirable to replace or at least to complement those processing techniques with a more reliable separation technique for the intrinsic ear canal movements.

BRIEF DESCRIPTION OF THE DRAWINGS

Reference will now be made in detail to embodiments, examples of which are illustrated in the accompanying drawings. The drawings illustrate various embodiments and are a part of the specification. The illustrated embodiments are merely examples and do not limit the scope of the disclosure. Throughout the drawings, identical or similar reference numbers designate identical or similar elements. In the drawings.

DETAILED DESCRIPTION

Figure 1:
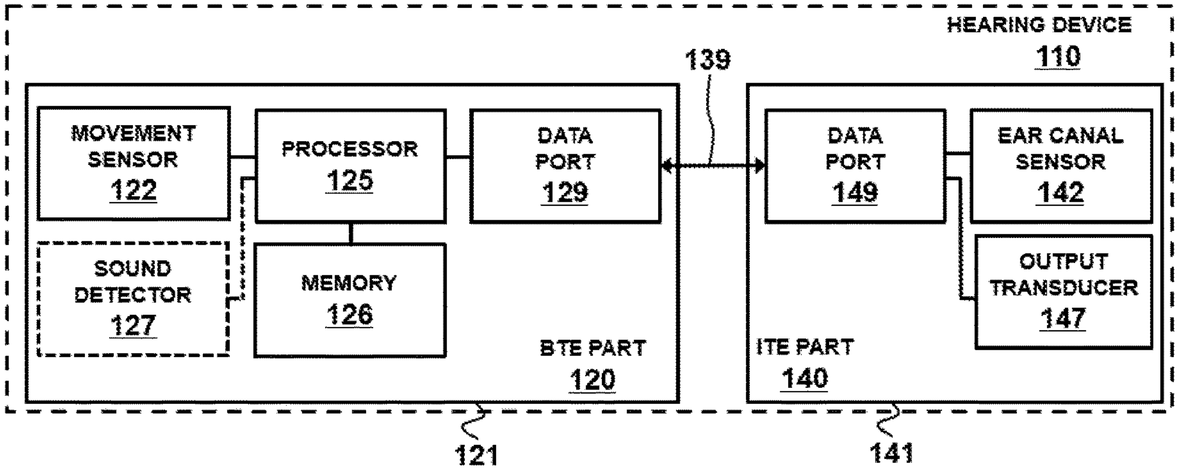
FIG. 1 schematically illustrates an exemplary hearing device comprising a BTE housing configured to be worn behind an ear of the user and an ITE housing configured to be at least partially inserted into an ear canal of the ear.

It is a feature of the present disclosure to avoid at least one of the above mentioned disadvantages and to propose a method of processing sensor data generated in a hearing device in which information about intrinsic ear canal movements can be separated from the ear canal sensor data in a less processing intensive and/or more reliable way. It is another feature to increase a signal quality of the ear canal sensor data, e.g., by advantageously employing a separation of information about intrinsic ear canal movements from the ear canal sensor data. It is yet another feature to provide for a suitable processing of the ear canal sensor data, e.g., depending on whether information about intrinsic ear canal movements has been identified in the ear canal sensor data. It is a further feature to reliably and/or quickly identify the intrinsic ear canal movements in the ear canal sensor data, more particularly to distinguish between different types of the intrinsic ear canal movements which may be related to at least one of speaking, chewing, drinking, medication intake, teeth clenching, coughing, sneezing, singing, hemming, or the like. It is another feature to propose a hearing device and/or a hearing system and/or a computer implemented medium having at least one of these advantages.

At least one of these features can be achieved by the methods, systems, and devices described herein.

Accordingly, the present disclosure proposes a method of processing sensor data generated in a hearing device, the hearing device comprising a BTE housing configured to be worn behind an ear of the user and an ITE housing configured to be at least partially inserted into an ear canal of the ear, the method comprising receiving, from a movement sensor included in the BTE housing, BTE housing movement data indicative of movements of the BTE housing; receiving, from an ear canal sensor included in the ITE housing, ear canal sensor data affected by movements of the ear canal wall; determining a correlation between the BTE housing movement data and at least part of the ear canal sensor data; and separating, based on said correlation, information about movements of the ear canal wall relative to the BTE housing from at least part of the ear canal sensor data.

Independently, the present disclosure proposes a non-transitory computer-readable medium storing instructions that, when executed by a processor, cause a hearing device to perform operations of the method.

Thus, the BTE housing movement data can be effectively employed to separate information about intrinsic ear canal wall movements from at least part of the ear canal sensor data. For instance, the correlation with the BTE housing movement data can be used as an indication of a presence of information in the ear canal sensor data which would be related to movements of the BTE housing. As a result, e.g., when such a presence is not indicated by the correlation with the BTE housing movement data, the information about movements of the ear canal wall relative to the BTE housing, which is unrelated to the movements of the BTE housing, can be separated from at least part of the ear canal sensor data independent from the information in the ear canal sensor data which is related to the movements of the BTE housing.

In particular, a calculational effort for determining such a correlation may be kept rather low in order to implement the separation of the intrinsic ear canal movement information from the ear canal sensor data in a rather processing efficient way. Further, by utilizing additional sensor information in the form of the BTE housing movement data, a reliability of the separation can be improved as compared to a separation method only relying on a signal processing of the ear canal sensor data. Such a signal processing, e.g., a frequency analysis or a statistical feature analysis of the ear canal sensor data or machine learning techniques, may be additionally employed to further increase a reliability of the information separation of the intrinsic ear canal movements, or the information separation may be fully based on the correlation with the BTE housing movement data, e.g., to save computational resources and/or required processing time. Separating the information about intrinsic ear canal wall movements from the ear canal sensor data can then be advantageously employed for various purposes, as further described below.

Independently, the present disclosure proposes a hearing device comprising a BTE housing configured to be worn behind an ear of the user; an ITE housing configured to be at least partially inserted into an ear canal of the ear; a movement sensor included in the BTE housing, the movement sensor configured to provide BTE housing movement data indicative of movements of the BTE housing; an ear canal sensor included in the ITE housing, the ear canal sensor configured to provide ear canal sensor data affected by movements of the ear canal wall; and a processing unit configured to receive the BTE housing movement data and the ear canal sensor data, wherein the processing unit is configured to determine a correlation between the BTE housing movement data and at least part of the ear canal sensor data; and to separate, based on said correlation, information about movements of the ear canal wall relative to the BTE housing from at least part of the ear canal sensor data.

Independently, the present disclosure proposes a hearing system comprising a hearing device configured to be worn at an ear of a user and a second hearing device configured to be worn at a second ear of the user and/or a user device portable by the user, the second hearing device and/or the user device communicatively coupled to the hearing device, the hearing device comprising a BTE housing configured to be worn behind the ear; an ITE housing configured to be at least partially inserted into an ear canal of the ear; a movement sensor included in the BTE housing, the movement sensor configured to provide BTE housing movement data indicative of movements of the BTE housing; and an ear canal sensor included in the ITE housing, the ear canal sensor configured to provide ear canal sensor data affected by movements of the ear canal wall, the hearing system further comprising a processing unit included in the hearing device and/or the second hearing device and/or the user device, the processing unit configured to receive the BTE housing movement data and the ear canal sensor data, wherein the processing unit is configured to determine a correlation between the BTE housing movement data and at least part of the ear canal sensor data; and to separate, based on said correlation, information about movements of the ear canal wall relative to the BTE housing from at least part of the ear canal sensor data. E.g., the hearing device may be denoted as a first hearing device configured to be worn at a first ear when the hearing system comprises the second hearing device.

Subsequently, additional features of some implementations of the method of processing sensor data and/or the computer-readable medium and/or the hearing device and/or the hearing system are described. Each of those features can be provided solely or in combination with at least another feature. The features can be correspondingly provided in some implementations of the method and/or the computer-readable medium and/or the hearing device and/or the hearing system.

In some implementations, the ear canal sensor comprises a physiological sensor configured to provide physiological sensor data indicative of a physiological property of the user, wherein said information about ear canal wall movements relative to the BTE housing is separated from the physiological sensor data. In some instances, the method further comprises evaluating, after the separating of the information about movements of the ear canal wall relative to the BTE housing, the physiological sensor data to determine a parameter associated with the physiological property of the user. In some instances, the physiological sensor data may not be evaluated, wherein the physiological sensor data may still be employed to separate the information about movements of the ear canal wall relative to the BTE housing from the physiological sensor data. In some instances, the correlation comprises a correlation determined between the BTE housing movement data and the physiological sensor data.

In some implementations, the ear canal sensor comprises an optical sensor configured to provide at least part of said ear canal sensor data as optical sensor data, the optical sensor comprising a light source configured to emit light toward the ear canal wall and a light detector configured to detect a reflected and/or scattered part of the light, the optical sensor data indicative of the detected light. In some instances, the information about ear canal wall movements relative to the BTE housing is separated from the optical sensor data. In some instances, the correlation comprises a correlation determined between the BTE housing movement data and the optical sensor data.

In some implementations, the ITE housing comprises a light emission area from which the light emitted by the light source can be emitted at the ITE housing toward the ear canal wall, and a light reception area at which the light to be detected by the light detector can be received at the ITE housing. E.g., the light emission area may be provided as an active area of the light source positioned at or close to a surface of the ITE housing and/or as a window in the ITE housing through which the light emitted by the light source can pass. E.g., the light reception area may be provided as an active area of the light detector positioned at or close to a surface of the ITE housing and/or as a window in the ITE housing through which the light can pass toward the light detector.

In some implementations, the ITE housing comprises a concave curvature that can be positioned at a bend of the ear canal when the ITE housing is at least partially inserted into the ear canal, e.g., such that the concave curvature contacts the ear canal wall at the bend, in particular at a convex curvature of the ear canal wall at the bend. In some instances, the light emission area and/or the light reception area extends through an inflection point of the concave curvature. In some instances, the light emission area and/or the light reception area is spaced from an inflection point of the concave curvature in a medial direction. E.g., the light emission area and/or the light reception area may be spaced from a virtual plane, which extends through the inflection point in parallel to a sagittal plane when the ITE housing is at least partially inserted into the ear canal, toward a front end of the ITE housing facing an inner region of the ear canal when the ITE housing is at least partially inserted into the ear canal. In some instances, the light emission area and/or the light reception area is provided at a side of the ITE housing opposing the side of the ITE housing which comprises the concave curvature, e.g., such that the light emission area and/or the light reception area faces away from a convex curvature of the ear canal wall at the bend when the ITE housing is at least partially inserted into the ear canal.

In some implementations, the physiological sensor comprises the optical sensor configured to emit the light at a wavelength absorbable by an analyte contained in blood such that the physiological sensor data included in the optical sensor data comprises information about the blood flowing through tissue at the ear. In some instances, the optical sensor is configured as a photoplethysmography (PPG) sensor such that the physiological sensor data included in optical sensor data comprises PPG data, e.g. a PPG waveform. In some implementations, the physiological sensor comprises a bioelectric sensor comprising at least one electrode configured to detect a bioelectric signal from the ear canal wall. In some instances, the bioelectric sensor comprises a skin impedance sensor and/or an electrocardiogram (ECG) sensor and/or an electroencephalogram (EEG) sensor and/or an electrooculography (EOG) sensor.

In some implementations, the method further comprises activating and/or deactivating the optical sensor depending on the separated information about movements of the ear canal wall relative to the BTE housing. In some instances, the optical sensor is activated when the separated information about ear canal wall movements relative to the BTE housing is indicative of ear canal wall movements below a threshold and/or deactivated when the separated information is indicative of ear canal wall movements above a threshold. In some instances, the optical sensor is activated when the separated information is indicative of ear canal wall movements above a threshold and/or deactivated when the separated information is indicative of ear canal wall movements below a threshold. In some instances, activating and/or deactivating the optical sensor further depends on whether the information separated from the optical sensor data is evaluated, or whether other information in the optical sensor data is evaluated, and/or whether both the information separated from the optical sensor data and other information in the optical sensor data is evaluated.

In some implementations, the movement sensor is a first movement sensor and the ear canal sensor comprises a second movement sensor configured to provide at least part of said ear canal sensor data as ITE housing movement data indicative of movements of the ITE housing, wherein the correlation comprises a correlation determined between the BTE housing movement data and the ITE housing movement data.

In some implementations, the method further comprises, after or before the separating of information about ear canal wall movements relative to the BTE housing, separating information about ear canal wall movements corresponding to the movements of the BTE housing from at least part of the ear canal sensor data. In some instances, the information about ear canal wall movements corresponding to the movements of the BTE housing is separated from the same ear canal sensor data from which the information about ear canal wall movements relative to the BTE housing is separated. In some instances, the ear canal sensor data comprises physiological sensor data, wherein information about movements of the ear canal wall relative to the BTE housing and information about ear canal wall movements corresponding to the movements of the BTE housing are subsequently separated from the physiological sensor data. In some instances, the ear canal sensor data comprises optical sensor data and/or ITE housing movement data, wherein information about movements of the ear canal wall relative to the BTE housing and information about ear canal wall movements corresponding to the movements of the BTE housing are subsequently separated from the optical sensor data and/or the ITE housing movement data.

In some implementations, the correlation is at least partially determined in a frequency domain. In some instances, the BTE housing movement data and at least part of the ear canal sensor data are transformed into the frequency domain to determine the correlation. In some instances, the correlation comprises a correlation between the BTE housing movement data and ITE housing movement data and/or a correlation between the BTE housing movement data and optical sensor data determined in the frequency domain. In some instances, the correlation is partially determined in the frequency domain and partially determined in a time domain. E.g., the correlation may comprise a correlation between the BTE housing movement data and a part of the ear canal sensor data determined in the frequency domain and a correlation between the BTE housing movement data and another part of the ear canal sensor data determined in the time domain.

In some implementations, the separating of information about ear canal wall movements relative to the BTE housing from at least part of the ear canal sensor data comprises removing the information about ear canal wall movements relative to the BTE housing from at least part of the ear canal sensor data; and/or extracting the information about ear canal wall movements relative to the BTE housing from at least part of the ear canal sensor data; and/or marking the information about ear canal wall movements relative to the BTE housing in at least part of the ear canal sensor data; and/or identifying the information about ear canal wall movements relative to the BTE housing in at least part of the ear canal sensor data.

In some implementations, the method further comprises evaluating the separated information about movements of the ear canal wall relative to the BTE housing to determine a parameter associated with a mandibular movement and/or an own voice activity of the user. In some instances, the method further comprises identifying, based on said parameter associated with the mandibular movement, a chewing and/or a clenching of teeth and/or a coughing and/or a yawning and/or a hemming and/or an intake of food and/or a fluid and/or a medication and/or a teeth cleaning activity by the user.

In some implementations, the method further comprises determining whether the parameter associated with the mandibular movement is indicative of a movement pattern representative of an activity of a clenching of teeth by the user which is distinguished from other activities of teeth clenching by the user; and controlling, when the parameter is indicative of the movement pattern, an operation of the hearing device. In some instances, the movement pattern is a first movement pattern representative of a first teeth clenching activity and the operation is a first operation, the method further comprising determining whether the parameter associated with the mandibular movement is indicative of a second movement pattern representative of a second teeth clenching activity which is distinguished from the first teeth clenching activity; and controlling, when the parameter is indicative of the second movement pattern, an operation of the hearing device. In some instances, the controlling of the operation of the hearing device comprises adjusting an audio output of the hearing device, e.g., a volume, and/or adjusting a parameter of an audio processing program, which may be executed by a processing unit of the hearing device, and/or adjusting a parameter of a sensor data processing program, which may be executed by the processing unit, and/or toggling between different programs, which may be executed by the processing unit, and/or accepting and/or declining a phone call, which may be received by the hearing device, and/or accepting and/or declining the operation.

In some implementations, the method further comprises controlling the movement sensor and the ear canal sensor to provide the BTE housing movement data and the ear canal sensor data at an equal time. In some instances, when the ear canal sensor comprises the second movement sensor and the optical sensor and/or another sensor, e.g., a physiological sensor, the first and second movement sensor and the optical sensor and/or the other sensor may be controlled to provide the BTE housing movement data, the ITE housing movement data, and the optical sensor data and/or the other sensor data at the equal time. In some instances, the first and second movement sensor may be controlled to continuously provide the BTE and ITE housing movement data during a period of time, and the optical sensor and/or other sensor may be controlled to provide the optical sensor data and/or the other sensor data discontinuously, e.g., at least once, within the period of time.

In some implementations, the method further comprises monitoring the BTE housing movement data; and controlling, depending on the BTE housing movement data, the ear canal sensor to provide at least part of the ear canal sensor data. In some instances, the movement sensor is controlled to continuously provide the BTE housing movement data during the monitoring. In some instances, the ear canal sensor is controlled to provide at least part of the ear canal sensor data when the BTE housing movement data is indicative of ear canal wall movements below a threshold. In some instances, the ear canal sensor is controlled to provide at least part of the ear canal sensor data when the BTE housing movement data is indicative of ear canal wall movements above a threshold. In some instances, controlling the ear canal sensor to provide at least part of the ear canal sensor data further depends on whether the information separated from at least part of the ear canal sensor data is evaluated, or whether other information in at least part of the ear canal sensor data is evaluated, and/or whether both the information separated from at least part of the ear canal sensor data and other information in at least part of the ear canal sensor data is evaluated. In some instances, the movement sensor is controlled to continuously provide the BTE housing movement data and the ITE housing movement data during the monitoring. The ear canal sensor may then be controlled, depending on the information separated from the ITE housing movement data, to provide a part of the ear canal sensor data different from the ITE housing movement data, e.g., the optical sensor data and/or other sensor data.

FIG. 1 illustrates an exemplary hearing device 110 configured to be worn at an ear of a user. Hearing device 110 may be implemented by any type of hearing device configured to enable or enhance hearing or a listening experience of a user wearing hearing device 110. Hearing device 110 includes a behind-the-ear (BTE) part 120 comprising a BTE housing 121 configured to be worn behind an ear of the user, and an in-the-ear (ITE) part 140 comprising an ITE housing 141 configured to be at least partially inserted into an ear canal of the ear. BTE part 120 further comprises a movement sensor 122 included in BTE housing 121. ITE part 140 further comprises an ear canal sensor 142 included in ITE housing 141. Hearing device 110 further comprises a processor 125 communicatively coupled to movement sensor 121, ear canal sensor 141, a memory 113, and an output transducer 117. Hearing device 110 may include additional components as may serve a particular implementation. E.g., as illustrated, hearing device 110 may further include a sound detector 127, wherein processor 125 may be communicatively coupled to sound detector 127. BTE part 120 and ITE part 140 are connected via a data connection 139 including a data port 129 in BTE part 120, and a data port 149 in ITE part 140.

Output transducer 147 may be implemented by any suitable audio output device, for instance a loudspeaker or a receiver of a hearing aid. In some examples, as illustrated, output transducer 147 is included in ITE housing 141. In other examples, output transducer 147 may be included in BTE housing 121. E.g., a sound generated by output transducer 147 may then be conducted into the ear canal via a sound tube.

Movement sensor 122 may be implemented by any suitable sensor configured to provide BTE housing movement data defined as movement data indicative of movements of BTE housing 121. When BTE housing 121 is worn behind the user's ear, the BTE housing movement data can thus contain information about various movement types of the user including movements of the user's body, e.g., walking or running, and movements of the user's head, e.g., rotating or tilting of the head. Those movements typically lead to corresponding movements of the ear including the ear canal wall. For instance, movement sensor 122 may comprise at least one inertial sensor. The inertial sensor can include, e.g., an accelerometer configured to provide the BTE housing movement data representative of an acceleration and/or displacement and/or rotation, and/or a gyroscope configured to provide the BTE housing movement data representative of a rotation. Movement sensor 122 may also comprise an electronic compass such as a magnetometer, which may provide the BTE housing movement data as directional variations relative to the earth's magnetic field. Movement sensor 122 may also comprise an optical detector such as a camera. E.g., the BTE housing movement data may be provided by generating optical detection data over time and evaluating variations of the optical detection data.

Ear canal sensor 142 may be implemented by any suitable sensor configured to provide sensor data, defined as ear canal sensor data, which are affected by movements of the ear canal wall. Those ear canal wall movements may be at least partially caused by movements of the user's body and/or head, as described above, which are also detectable by movement sensor 122 included in BTE housing 121. The ear canal wall movements affecting the ear canal sensor data, however, can also include movements of the ear canal wall relative to a remaining part of the user's head, e.g., relative to the cranial bones and/or relative to the auricle of the ear behind which the BTE housing is worn. In consequence, when BTE housing 121 is worn behind the user's ear and ITE housing 140 is at least partially inserted into the ear canal, the ear canal sensor data can also contain information about movements of the ear canal wall relative to BTE housing 121, which may also be defined as intrinsic ear canal wall movements. Determining a correlation between the BTE housing movement data and the ear canal sensor data can be employed to separate information about movements of the ear canal wall relative to the BTE housing from the ear canal sensor data, as further described below.

Sound detector 127 may be implemented by any suitable sound detection device, such as a microphone, in particular a microphone array, and/or a voice activity detector (VAD), and is configured to detect a sound presented to a user of hearing device 110. The sound can comprise ambient sound such as audio content (e.g., music, speech, noise, etc.) generated by one or more sound sources in an ambient environment of the user. The sound can also include audio content generated by a voice of the user during an own voice activity, such as speech by the user. In some examples, as illustrated, sound detector 127 is included in BTE housing 121. In other examples, sound detector 127 and/or another sound detector may be included in ITE housing 141. E.g., a sound detector included in ITE housing 141 may be provided as an ear-canal microphone.

In some examples, as illustrated, processor 125 and/or memory 126 is included in BTE housing 121. Processor 125 may then be communicatively coupled to components 142, 147 included in ITE housing 141 via data connection 139. In some other examples, processor 125 and/or memory 126 may be included in ITE housing 141. Processor 125 may then be communicatively coupled to components 122, 127 included in BTE housing 121 via data connection 139. In some further examples, processor 125 may be a first processor and/or memory 126 may be a first memory included in BTE housing 121, wherein a second processor and/or a second memory is included in ITE housing 141. The first processor 125 included in BTE housing 121 may then be communicatively coupled to the second processor included in ITE housing 141 via data connection 139. E.g., the first and second processor may be provided as a distributed processing system and/or in a master/slave configuration of the processors. Accordingly, a processing unit may comprise processor 125 included in BTE housing 121, as illustrated, or a processing unit may comprise processor 125 included in ITE housing 141, or a processing unit may comprise the first processor 125 provided in BTE housing 121 and a second processor provided in ITE housing 141.

Processing unit 125 is configured to access the BTE housing movement data provided by movement sensor 122, and the ear canal sensor data provided by ear canal sensor 142, e.g., via data connection 139. Processing unit 125 is further configured to determine a correlation between the BTE housing movement data and at least part of the ear canal sensor data; and to separate, based on the correlation, information about movements of the ear canal wall relative to BTE housing 121 from at least part of the ear canal sensor data. Those and other implementations are further described in the following description.

Memory 126 may be implemented by any suitable type of storage medium and is configured to maintain, e.g. store, data controlled by processor 125, in particular data generated, accessed, modified and/or otherwise used by processor 125. Memory 126 may be configured to store instructions that can be executed by processor 125, e.g., an algorithm and/or a software that can be accessed and executed by processor 125. For example, the instructions may comprise a processing of the BTE housing movement data provided by movement sensor 122 and the ear canal sensor data provided by ear canal sensor 142. As another example, the instructions may specify how processor 125 processes audio content, e.g., modifying an audio content included in audio data detected by sound detector 127, before presenting the audio content to the user via output transducer 147. Memory 126 may also maintain data representative of settings for the sound processing, e.g., different sound processing settings adapted to different acoustic scenes. The instructions may also specify how a momentary acoustic scene in an environment of the user may be determined, for instance by classifying audio data detected by sound detector 127. Processor 125 may also comprise a sound processor, e.g., a digital signal processor (DSP) and/or an audio classifier, for executing at least one of these tasks, which may be implemented in hardware and/or software. Memory 126 may comprise a non-volatile memory from which the maintained data may be retrieved even after having been power cycled, for instance a flash memory and/or a read only memory (ROM) chip such as an electrically erasable programmable ROM (EEPROM). A non-transitory computer-readable medium may thus be implemented by memory 126. Memory 126 may further comprise a volatile memory, for instance a static or dynamic random access memory (RAM).

Figure 2:
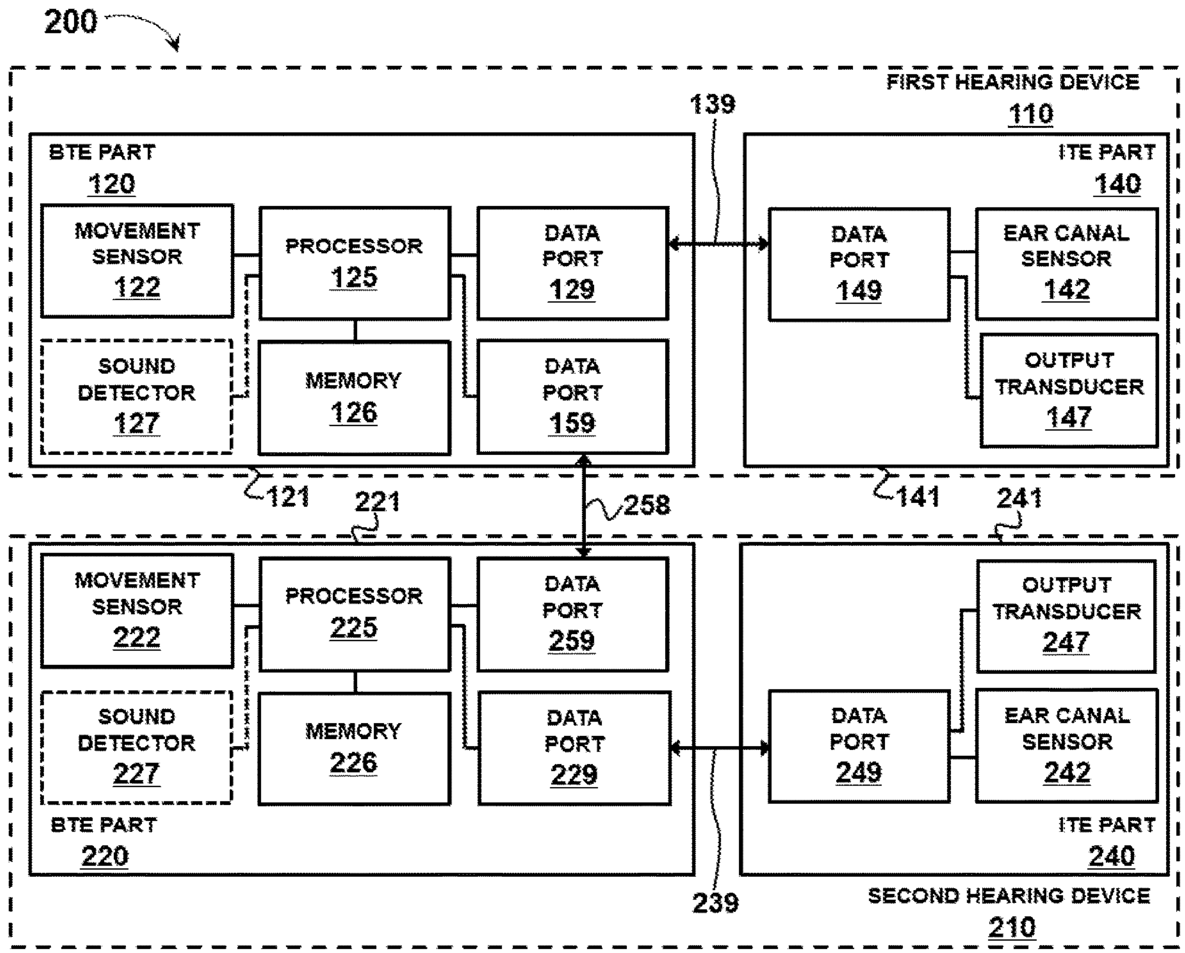
FIG. 2 schematically illustrates an exemplary hearing system comprising the hearing device illustrated in FIG. 1 configured to be worn at a first ear, and a corresponding hearing device configured to be worn at a second ear.

FIG. 2 illustrates an exemplary hearing system 200 comprising hearing device 110 as a first hearing device configured to be worn at a first ear of a user, and a second hearing device 210 configured to be worn at a second ear of the user. Hearing system 200 may also be referred to as a binaural hearing device. Second hearing device 210 includes, in a configuration corresponding to first hearing device 110 including first BTE part 120 comprising first BTE housing 121 and first ITE part 140 comprising first ITE housing 141, a second BTE part 220 comprising a second BTE housing 221 configured to be worn behind the second ear of the user, and a second ITE part 240 comprising a second ITE housing 241 configured to be at least partially inserted into an ear canal of the second ear. Second BTE part 220 comprises a movement sensor 221 included in second BTE housing 221. Second ITE part 240 comprises an ear canal sensor 242 included in second ITE housing 241. Second BTE part 220 and second ITE part 240 are connected via a second data connection 239, wherein data connection 139 included in first hearing device 110 is denoted as a first data connection. The second data connection 239 includes a data port 229 in second BTE part 220, and a data port 249 in second ITE part 240.

Hearing system 200 further comprises a second processor 225 included in second hearing device 210, in addition to first processor 125 included in first hearing device 110. Second processor 225 is communicatively coupled to movement sensor 222, ear canal sensor 241, a memory 213, and an output transducer 217 included in second hearing device 210. Second processor 225 may also be communicatively coupled to a sound detector 227 which may be included in second hearing device 210, e.g., in second BTE part 220 and/or in second ITE part 240. A processing unit comprises first and second processor 125, 225. E.g., processing unit 125, 225 may be provided as a distributed processing system and/or in a master/slave configuration of the first and second processor.

First hearing device 110 and second hearing device 210 are interconnected via a third data connection 258. Third data connection 258 comprises a data port 159 included in first hearing device 110, which may be provided in addition to data ports 129, 149 of first data connection 139 included in first hearing device 110, and a data port 259 included in second hearing device 210, which may be provided in addition to data ports 229, 249 of second data connection 239 included in second hearing device 210. Data ports 159, 259 may be configured for wired and/or wireless data communication via third data connection 258. For instance, data may be exchanged wirelessly via third data connection 258 by a radio frequency (RF) communication. Data ports 159, 259 may then be implemented as transceivers. E.g., data may be communicated in accordance with a Bluetooth™ protocol and/or by any other type of RF communication. In the illustrated example, data ports 159, 259 of third data connection 258 are included in first and second BTE housing 121, 221. The processors included in processing unit 125, 225 are communicatively coupled via third data connection 258.

Figure 3:
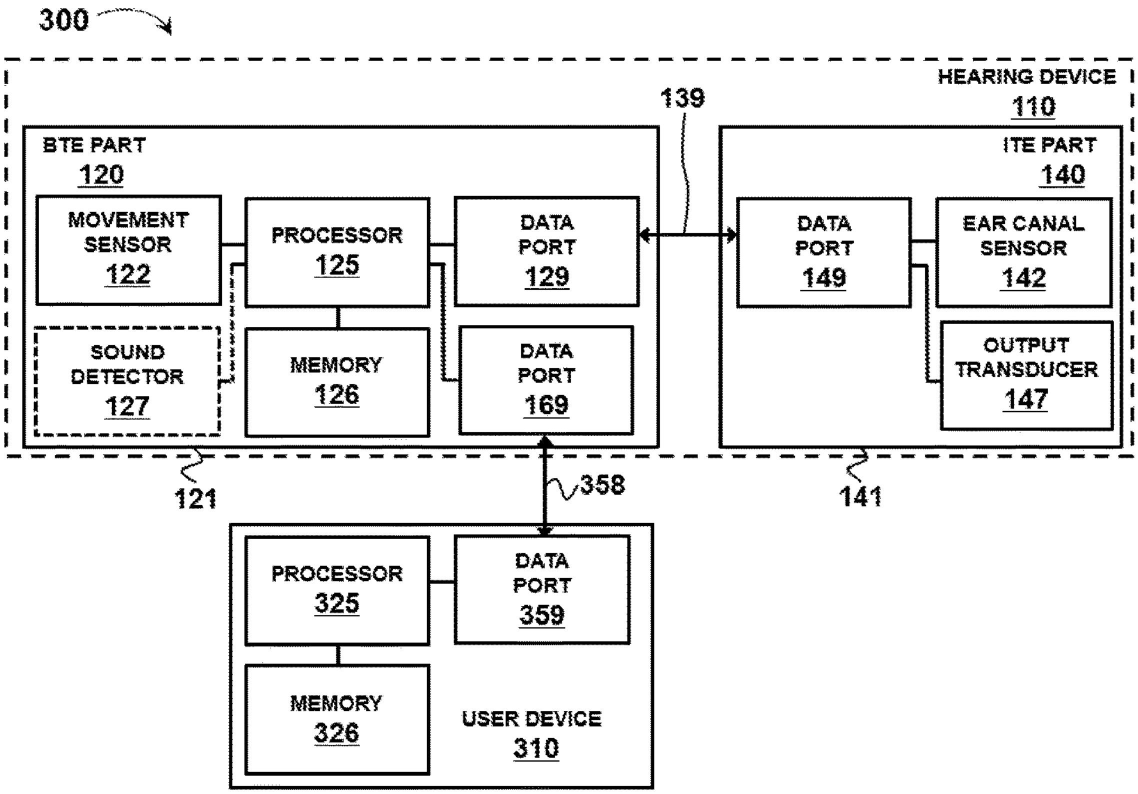
FIG. 3 schematically illustrates an exemplary hearing system comprising the hearing device illustrated in FIG. 1 and a user device.

FIG. 3 illustrates an exemplary hearing system 300 comprising hearing device 110 and a user device 310. User device 310 may be an electronic device portable and/or wearable by the user. For instance, user device 310 may be implemented as a communication device such as a smartphone, a smartwatch, a tablet and/or the like. Hearing system 300 comprises a second processor 325 included in user device 310 in addition to first processor 125 included in hearing device 110. A processing unit comprises first and second processor 125, 325. Hearing device 110 and user device 310 are interconnected via a second data connection 358, wherein data connection 139 between BTE part 120 and ITE part 140 of hearing device 110 is denoted as a first data connection. Second data connection 358 comprises a data port 169 included in hearing device 110, which may be provided in addition to data ports 129, 149, and a data port 359 included in user device 310. Data ports 169, 359 may be configured for wired and/or wireless data communication via second data connection 358.

In some implementations, hearing system 300 comprises binaural hearing device 200 in place of hearing device 110, and user device 310. Processor 325 included in user device 310 may then be denoted as a third processor. Data connection 358 between first hearing device 110 and user device 310 may then be denoted as a fourth data connection. In some instances, a fifth data connection between second hearing device 210 and user device 310 may be correspondingly provided. A processing unit may then comprise processors 125, 225, 325, which can be communicatively coupled via third and fourth data connection 258, 358 and/or the fifth data connection.

Figure 4:
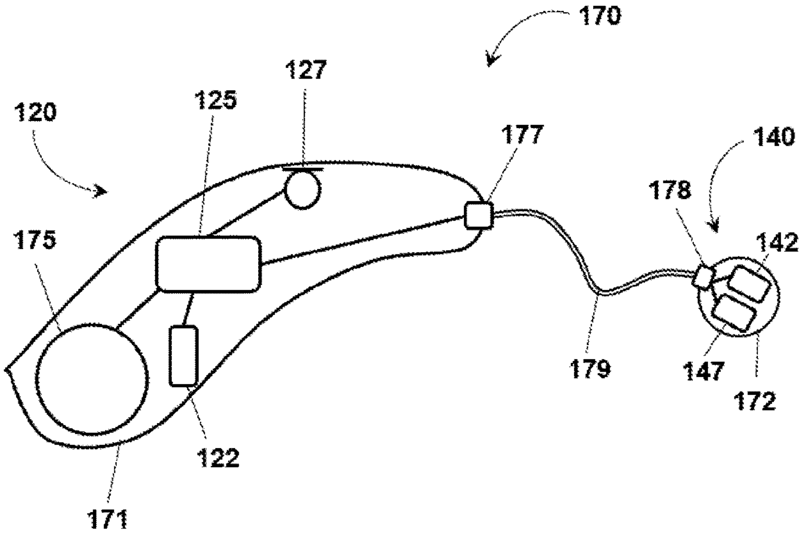
FIG. 4 schematically illustrates some embodiment of the hearing device illustrated in FIG. 1 as a RIC hearing aid.

FIG. 4 illustrates exemplary implementations of hearing device 110 as a RIC hearing aid 170. ITE part 140 is implemented as an earpiece, wherein ITE housing 141 is implemented as an earpiece housing 172 accommodating ear canal sensor 142 and output transducer 147. BTE housing 121 of BTE part 120 is implemented as a housing 171 with a curved surface shaped to be positioned behind the ear, which accommodates processing unit 125, movement sensor 122, and sound detector 127. BTE part 120 further includes a battery 175 as a power source for the above described components. Data connection 139 is implemented as a cable 179 comprising data ports 129, 149 implemented as respective cable connectors 177, 178 to connect cable 179 to BTE housing 121 and ITE housing 141. In other examples, data connection 139 may be wireless. In binaural hearing device 200, as illustrated in FIG. 2, second hearing device 210 may be correspondingly implemented as RIC hearing aid 170.

Figure 5:
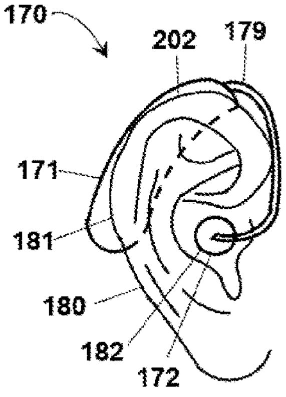
FIG. 5 schematically illustrates positions at which the hearing device illustrated in FIG. 4 can be worn at an ear of a user.

FIG. 5 illustrates MC hearing aid 170 worn at an ear 180 of a user. Ear 180 comprises an auricle 181 and an ear canal 182. Curved shaped housing 171 is worn behind ear 180. In particular, curved shaped housing 171 sits on top of a region behind ear 180 which connects auricle 181 to the user's skull. Earpiece housing 172 is at least partially inserted into ear canal 182.

Figure 6:
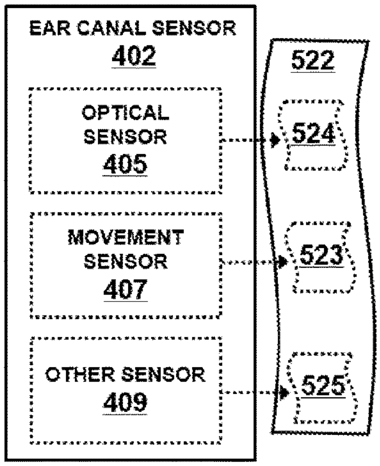
FIG. 6 schematically illustrates an ear canal sensor that may be implemented in the hearing device illustrated in FIG. 1.

FIG. 6 illustrates an exemplary ear canal sensor 402 which may be implemented as ear canal sensor 142 included in ITE housing 141 of hearing device 110 and/or as ear canal sensor 242 included in ITE housing 241 of hearing device 210. Ear canal sensor 402 comprises an optical sensor 405 and/or a movement sensor 407 and/or another sensor 409 configured to provide ear canal sensor data 522 affected by movements of the ear canal wall. Ear canal sensor data 522 provided by ear canal sensor 402 may thus include ITE housing movement data 523 provided by movement sensor 407 and/or optical sensor data 524 provided by optical sensor 405 and/or other sensor data 525 provided by other sensor 409.

Optical sensor 405 may be implemented by any suitable sensor comprising a light source configured to emit light toward the ear canal wall when ITE housing 141, 241 is at least partially inserted into the ear canal, and a light detector configured to detect a reflected and/or scattered part of the light. Optical sensor 405 can thus be configured to provide optical sensor data 524 indicative of the detected light. In some implementations, the light source of optical sensor 405 is configured to emit the light at a wavelength absorbable by an analyte contained in blood. Optical sensor 405 can thus be configured as a physiological sensor providing physiological sensor data included in optical sensor data 524 comprising information about the blood flowing through tissue at the ear. For example, optical sensor 405 may be configured as a photoplethysmography (PPG) sensor such that the physiological sensor data included in optical sensor data comprises PPG data, e.g. a PPG waveform.

Movement sensor 407 may be implemented by any suitable sensor configured to provide ITE housing movement data 523 defined as movement data indicative of movements of ITE housing 141, 241. For instance, movement sensor 407 may comprise an inertial sensor, e.g., an accelerometer and/or a gyroscope, and/or a magnetometer. Movement sensor 122, 222 included in BTE housing 121, 221 of hearing device 110, 210 may be denoted as a first movement sensor of hearing device 110, 210, and movement sensor 407 comprised in ear canal sensor 142, 242, 402 included in ITE housing 141, 241 of hearing device 110, 210 may be denoted as a second movement sensor of hearing device 110, 210. In some implementations, first and second movement sensor 122, 222 and 407 of hearing device 110, 210 are provided as a corresponding sensor type. For example, first and second movement sensor 122, 222 and 407 of hearing device 110, 210 may both comprise an inertial sensor, e.g., an accelerometer.

Other sensor 409 configured to provide other ear canal sensor data 525 affected by movements of the ear canal wall may be included in ear canal sensor 402 in place of optical sensor 405 and/or movement sensor 407, or in addition to optical sensor 405 and/or movement sensor 407, or as a single sensor. In some implementations, other sensor 409 comprises a physiological sensor configured to provide physiological sensor data indicative of a physiological property of the user. For instance, other sensor 409 may comprise a bioelectric sensor. Bioelectric sensor 409 may comprise at least one electrode sensitive to a bioelectric signal present at the ear canal wall and/or penetrating the ear canal wall, and may be configured to provide other sensor data 525 as bioelectric sensor data indicative of the bioelectric signal. E.g., the bioelectric signal may be an electrical current and/or electromagnetic radiation and/or a potential generated by the user's body. For example, ear canal sensor 402 may comprise movement sensor 122, 222 and the bioelectric sensor, which may be provided in place of optical sensor 405 or in addition to optical sensor 405. E.g., the bioelectric sensor may comprise at least one of a skin impedance sensor, an electrocardiogram (ECG) sensor, an electroencephalogram (EEG) sensor, and an electrooculography (EOG) sensor.

As another example, other sensor 409 may comprise a bone conduction sensor, e.g., a pressure sensor, configured to pick up a signal from the ear canal wall transmitted through the user's head via bone conduction, e.g., a bone conducted signal originating from the user's vocal cords, and configured to provide other sensor data 525 indicative of the bone conducted signal. As another example, other sensor 409 may comprise an ear canal microphone, e.g., to pick up bone conducted sound and/or other sound in the ear canal.

Ear canal sensor data 523, 524, 525 may not only be affected by movements of the ear canal wall relative to BTE housing 121, 171, 221, but also by movements of the ear canal wall corresponding to movements of BTE housing 121, 171, 221. E.g., movements of BTE housing 121, 171, 221 worn behind the ear caused by head movements of the user, and a corresponding acceleration of ITE housing 141, 241 inserted into the ear canal, may lead to a displacement of ear canal sensor 142 included in ITE housing 141, 241 relative to the ear canal and/or corresponding to the ear canal when following the head movement, wherein only one or both kinds of those displacements of ear canal sensor 142 inside the ear canal may impact ear canal sensor data 523, 524, 525. In some examples, different ear canal sensor data 523, 524, 525 provided by different sensors 405, 407, 409 included in ear canal sensor 402 may be affected by the ear canal displacements in a different way.

Figure 7:
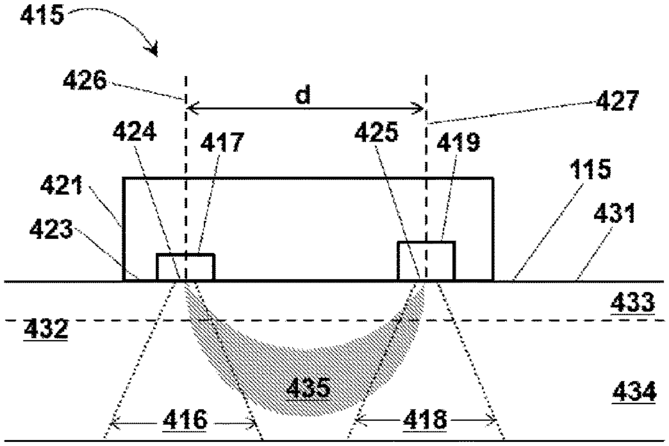
FIG. 7 schematically illustrates an optical sensor that may be included in the ear canal sensor illustrated in FIG. 6.

FIG. 7 illustrates an exemplary optical sensor 415 which may be implemented as optical sensor 405 in ear canal sensor 402 illustrated in FIG. 6. Optical sensor 415 comprises a light source 417 configured to emit light toward an ear canal wall 431, and a light detector 419 configured to detect a reflected and/or scattered part of the light. Light source 417 and a light detector 419 are included in an ITE housing 421, which may be implemented as ITE housing 141 of hearing device 110 and/or as ITE housing 241 of hearing device 210. In the illustrated example, ITE housing 421 is positioned at ear canal wall 431 such that a surface 423 of ITE housing 421 contacts ear canal wall 431. In other examples, surface 423 may be positioned in the ear canal at a distance to ear canal wall 431.

Ear canal wall 431 provides a surface of tissue 432 at the ear. Ear tissue 432 may comprise at least one outer tissue layer 433, and at least one inner tissue layer 434. For example, outer tissue layer 433 may comprise at least one skin layer, and inner tissue layer 434 may comprise at least one layer of subcutaneous tissue including blood vessels. Surface 423 of ITE housing 421 comprises a light emission area 424 and a light reception area 425. An exemplary spatial distribution of possible and/or most probable pathways 435 of light emitted at a specific point at light emission area 424 arriving at a specific point at light reception area 425, e.g., by means of scattering processes inside tissue 432, is schematically indicated as a shaded area. As illustrated, spatial light path distribution 435 can reach into outer tissue layer 433 and may also reach into inner tissue layer 434.

Light source 417 is configured to provide light that can be emitted from light emission area 424. E.g., light source 417 may be implemented as a light emitting diode (LED), or a plurality of LEDs. The emitted light can illuminate an illumination volume 416 extending through ear canal wall 431 into ear tissue 432 when ITE housing 421 is at least partially inserted into the ear canal. In some examples, light emission area 424 may be provided as an active area of light source 417 arranged at surface 423, or light emission area 424 may be connected to light source 417 spaced from surface 423 via a waveguide, or light emission area 424 may be provided as a window in ITE housing 421 through which the emitted light is transmissible. In the schematic illustration in FIG. 7, illumination volume 416 may be regarded as a volume that would be illuminated by the emitted light when disregarding an interaction of the emitted light with ear canal wall 431 and/or tissue 432, for example corresponding to a situation in which ITE housing 421 would be removed from ear canal wall 431, and/or before the emitted light would interact with ear canal wall 431 and/or tissue 432, for example reflected and/or scattered and/or absorbed. When ITE housing 421 is positioned at ear canal wall 431, illumination volume 416 may be altered corresponding to an interaction of the emitted light with ear canal wall 431 and/or tissue 432.

Light detector 419 is configured to detect light arriving from an acceptance volume 418 including light reception area 425. E.g., light detector 419 may be implemented as a photodetector or a plurality of photodetectors. Acceptance volume 418 extends through ear canal wall 431 into ear tissue 432 when ITE housing 421 is at least partially inserted into the ear canal. A part of the light emitted by light source 417, which is reflected at ear canal wall 431 and/or scattered by ear tissue 432 into acceptance volume 418 can thus be detected by light detector 419. For instance, light reception area 425 may be provided as an active area of light detector 419 arranged at surface 423, or light reception area 425 may be connected to light detector 419 spaced from surface 423 via a light guide, or light reception area 425 may be provided as a window in ITE housing 421 through which the reflected and/or scattered light is transmissible. In the schematic illustration, acceptance volume 418 may be regarded as a volume from which light detectable by light detector 419 may arrive at light reception area 425 by disregarding an interaction of the light with ear canal wall 431 and/or tissue 432. When ITE housing 421 is positioned at ear canal wall 431, acceptance volume 418 may be altered corresponding to an interaction of the light detectable by light detector 419 with ear canal wall 431 and/or tissue 432.

As illustrated, light emission area 424 is provided at a distance d from light reception area 425. For instance, distance d may be defined as a distance between a center 426 of light emission area 424 and a center 427 of light reception area 425. Distance d may be selected depending on a desired application of optical sensor 415. In some implementations, e.g., when optical sensor is employed as a physiological sensor such that the optical sensor data comprises physiological sensor data comprising information about blood flowing through ear tissue 432 in addition to information about movements of ear canal wall 431, distanced may be selected large enough to allow light path distribution 435 to extend rather deep into ear tissue 432, e.g., such that spatial light path distribution 435 reaches into outer and inner tissue layer 433, 434. In other implementations, e.g., when optical sensor is mainly employed to probe movements of ear canal wall 431 such that the optical sensor data shall be rather unaffected from information other than information about movements of ear canal wall 431, distance d may be selected smaller to provide for a light path distribution 435 extending rather shallow into ear tissue 432, e.g., such that spatial light path distribution 435 may only reach into outer tissue layer 433 and/or may be reflected, at least to a certain extent, at ear canal wall 431.

Additionally or alternatively, a wavelength of the light emitted by light detector 419 and/or detectable by light detector 419 may be selected in accordance with the desired application of optical sensor 415. E.g., when optical sensor is employed as a physiological sensor, at least one wavelength of the light emitted by light source 417 and detectable by light detector 419 may be selected to be absorbable by an analyte or a plurality of analytes contained in tissue 432, e.g., hemoglobin, water, lipid, and/or glucose. E.g., when optical sensor is mainly employed to probe movements of ear canal wall 431, the light emitted by light source 417 and detectable by light detector 419 may be selected to be rather non-absorbable within tissue 432. Additionally or alternatively, a position of light emission area 424 and/or light reception area 425 at surface 423 of ITE housing 421 may be selected in accordance with the desired application of optical sensor 415, e.g., as further illustrated below.

Figure 8:
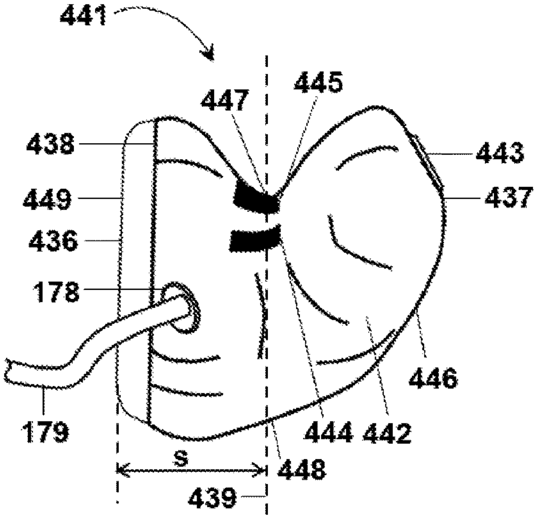
FIGS. 8, 9, 11 schematically illustrate exemplary ITE housings that may be implemented in the hearing device illustrated in FIG. 1.

FIG. 8 illustrates an exemplary earpiece housing 441 which may be implemented as ITE housing 141, 241, 172, 421. Earpiece housing 441 comprises a housing shell 442 customized to a shape of an individual ear canal. For instance, housing shell 442 may be formed from a resin, e.g., a synthetic material or a metal, by additive manufacturing techniques, e.g., in a three-dimensional (3D) printing process such as a digital light processing (DLP) or another stereolithography (SLA) process. In order to customize the shape of housing shell 442 to the ear canal of an individual user, a user-specific ear canal geometry may be determined beforehand, e.g., from an ear impression taken from the user.

Housing shell 442 comprises a sound outlet 443 at a front end 437 of housing shell 442. When earpiece housing 441 is at least partially inserted into the ear canal, front end 437 of housing shell 442 faces an inner region of the ear canal leading toward the tympanic membrane. A sound generated by output transducer 147, 247, which may be accommodated in an inner volume enclosed by housing shell 442, can thus be delivered into the ear canal. Earpiece housing 441 further comprises a faceplate 449 covering an open rear end 438 of housing shell 442. A rear end 436 of earpiece housing 441 may be defined by an outer face of faceplate 449. When earpiece housing 441 is at least partially inserted into the ear canal, rear end 436, 438 faces away from the inner region of the ear canal. Cable 179 is connected to earpiece housing 441 via cable connector 178. Cable connector 178 can be provided at housing shell 442, as illustrated, or at faceplate 449.

Light emission area 424 and light reception area 425 are implemented as a respective window 444, 445 formed in a lateral wall 446 of housing shell 442. Lateral wall 446 extends between front end 437 and rear end 438 of housing shell 442. When earpiece housing 441 is at least partially inserted into the ear canal, lateral wall 446 extends at least partially along ear canal wall 431. For example, an active area of light source 417 may be positioned at or inside light emission window 444 and/or an active area of light detector 419 may be positioned at or inside light detection window 445. As another example, light emission window 444 may be transparent or translucent to light that can be emitted by light source 417 and/or light detection window 445 may be transparent or translucent to light detectable by light detector 419. Light source 417 and light detector 419 may be accommodated inside an inner volume enclosed by housing shell 442, e.g., at or close to window 444, 445, or at a distance from window 444, 445 and/or connected to window 444, 445 via a light guide.

Housing shell 442 comprises a concave curvature 447 conforming to a bend of the ear canal, in particular to a convex curvature of the ear canal wall at the bend. E.g., concave curvature 447 of housing shell 442 may be shaped complementary to the convex curvature of the ear canal wall at the bend. FIG. 8 further illustrates a virtual plane 439 extending through an inflection point of concave curvature 447 in parallel to a sagittal plane of the user's body when earpiece housing 441 is at least partially inserted into the ear canal. The sagittal plane is defined, in anatomical terms, as a plane extending between a sagittal and longitudinal body axis, in particular a plane which divides the body into a left and right part. A distance s of concave curvature 447 from rear end 436 of earpiece housing 441, or from rear end 438 of housing shell 442, may be defined as the distance between virtual plane 439 and rear end 436, 438, e.g., a plane in parallel to the sagittal plane extending through rear end 436, 438. Concave curvature 447 is provided in housing shell 442 at a side of lateral wall 446 facing the convex curvature of the ear canal wall at the bend when earpiece housing 441 is at least partially inserted into the ear canal. A side 448 of lateral wall 446 opposing the side provided with concave curvature 447 may have a smaller curvature at the position of virtual plane 439, which may be convex or concave, or may be substantially flat, in accordance with the individual shape of the ear canal. Side 448 of lateral wall 446 is facing away from the convex curvature of the ear canal wall at the bend when earpiece housing 441 is at least partially inserted into the ear canal.

Windows 444, 445 are formed in housing shell 442 at concave curvature 447. In the illustrated example, light detection window 445 extends through an inflection point of concave curvature 447, e.g., through the inflection point comprised in virtual plane 439. In this way, light detection window 447 faces the convex curvature of the ear canal wall at the bend of the ear canal when earpiece housing 441 is at least partially inserted into the ear canal. E.g., light detection window 445 may contact the ear canal wall at the bend. Light emission window 444 is positioned at a distance from light detection window 445, e.g., at distance d illustrated in FIG. 6, in a circumferential direction of housing shell 442, e.g., along virtual plane 439. In other examples, the distance between light emission window 444 and light detection window 445 may extend in a longitudinal direction of housing shell 442, or both in the circumferential and longitudinal direction. The longitudinal direction of housing shell 442 may be defined as a direction in which housing shell 442 is insertable into the ear canal and/or a direction perpendicular to the circumferential direction. In other examples, light emission window 444 extends through an inflection point of concave curvature 447 and light detection window 445 is provided at distance d therefrom. In other examples, light emission window 444 and light detection window 445 both extend through an inflection point of concave curvature 447.

Such an arrangement of windows 444, 445 can be favorable when optical sensor 405, 415 is employed as a physiological sensor. In particular, the positioning of light emission window 444 and/or light detection window 445 close to the convex ear canal wall curvature at the bend can provide for favorable sampling properties of tissue 432 to be probed by optical sensor 405, 415 and/or can contribute to a reduced amount of straylight negatively affecting the physiological measurement. As a result, a stronger physiological data signal with regard to information about blood flowing through tissue at the ear may be obtained, e.g., with regard to information about a blood analyte absorbing light at a wavelength of the emitted and detectable light. At the same time, the detected light can contain information about movements of the ear canal wall, which can thus also be included in the optical sensor data provided by optical sensor 405, 415.

Figure 9:
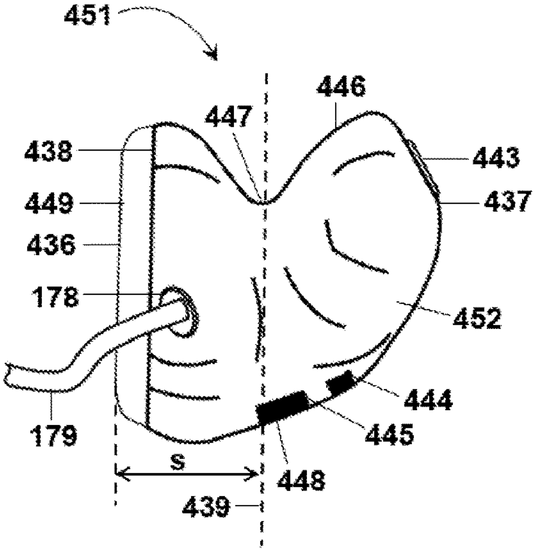

FIG. 9 illustrates another exemplary earpiece housing 451 which may be implemented as ITE housing 141, 241, 172, 421. Earpiece housing 451 comprises a housing shell 452 substantially corresponding to housing shell 442 with the exception that windows 444, 445 are provided at a different position. Windows 444, 445 are formed in housing shell 452 at side 448, which is facing away from the convex ear canal wall curvature at the bend of the ear canal when earpiece housing 441 is at least partially inserted into the ear canal. Further, windows 444, 445 are formed in housing shell 452 at a position shifted from the inflection point of concave curvature 447, as defined by virtual plane 439, in the longitudinal direction of housing shell 442 toward front end 437 of housing shell 442. Windows 444, 445 thus have a larger distance from rear end 436, 438 as compared to distance s of concave curvature 447 from rear end 436, 438. In anatomical terms, when earpiece housing 451 is at least partially inserted into the ear canal, windows 444, 445 can be positioned medial relative to virtual plane 439, e.g., medial relative to the bend of the ear canal. Further, windows 444, 445 can be positioned inferior to a portion of the ear canal wall having the convex curvature at the bend, e.g., at a side of the ear canal opposing the side at which the ear canal wall has the convex curvature at the bend.

In some other examples, windows 444, 445 may be shifted from the inflection point of concave curvature 447 toward front end 437 at the side of housing shell 452 at which concave curvature 447 is provided, in particular the side of housing shell 452 facing the convex ear canal wall curvature at the bend when inserted into the ear canal. In some other examples, at least one of windows 444, 445 may be positioned at virtual plane 439 at the at side 448 facing away from the convex ear canal wall curvature at the bend. In some other examples, at least one of windows 444, 445 may be positioned at a circumferential position between the side facing the convex ear canal wall curvature and side 448 facing away from the convex ear canal wall curvature. In the illustrated example, the distance between light emission window 444 and light detection window 445 extends in the longitudinal direction of housing shell 442. Light detection window 445 is positioned closer to virtual plane 439 than light emission window 444. In other examples, light emission window 444 may be positioned closer to virtual plane 439 than light detection window 445. In other examples, light emission window 444 may be positioned closer to virtual plane 439 than light detection window 445. In other examples, the distance between light emission window 444 and light detection window 445 may extend in the circumferential direction of housing shell 442, or both in the circumferential and longitudinal direction.

Such an arrangement of windows 444, 445 can be employed to provide windows 444, 445 at a position at the ear canal closer to a temporomandibular joint of the user when earpiece housing 441 is at least partially inserted into the ear canal. The temporomandibular joint connects a jawbone, also referred to as a mandible, to a skull of the user. A movement of the jaw bone relative to the skull, also referred to as mandibular movement, can cause a corresponding movement of the ear canal wall. In this way, by positioning windows 444, 445 closer to the temporomandibular joint, information in the detected light about the mandibular movement, may be enhanced. E.g., a smaller signal related to the mandibular motion may be obtained when the user is talking or drinking, and a larger signal related to the mandibular motion may be obtained when the user is chewing or clenching his teeth. In some examples, when optical sensor 405, 415 is employed as a physiological sensor, the optical sensor data can comprise information about blood flowing through tissue at the ear in addition to the information about movements of the ear canal wall. In some other examples, optical sensor 405, 415 may be mainly employed to provide the information about the movements of the ear canal wall.

Figure 10:
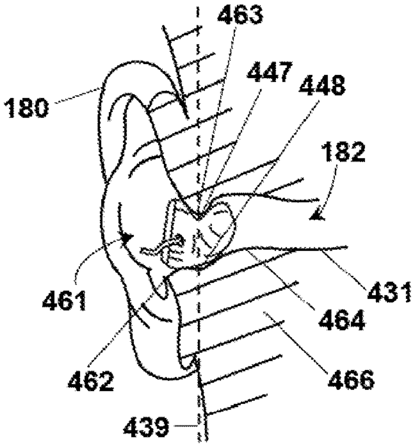
FIG. 10 schematically illustrates an ITE housing at least partially inserted into an ear canal.

FIG. 10 illustrates an exemplary earpiece housing 461 at least partially into ear canal 182 of ear 180. For instance, earpiece housing 461 may be implemented as earpiece housing 441, 451. Concave curvature 447 of earpiece housing 461 faces a convex curvature 463 of ear canal wall 431 at a bend of ear canal 182. In particular, ear canal 431 extends into a volume surrounded by concave curvature 447 at the position of bend 463 and/or contacts ear canal 431 at the position of bend 463. More generally, ear canal 431 may comprise a first bend 463 located closer to an entrance 461 of ear canal 431, and a second bend 464 located further away from entrance 461 of ear canal 431 and/or closer to a tympanic membrane inside ear canal 431. In the illustrated example, earpiece housing 461 is configured such that concave curvature 447 faces the convex ear canal wall curvature at first bend 463.

A temporomandibular joint 466 is located at a side of ear canal 182 opposing the side of ear canal 182 at which ear canal wall 431 has the convex curvature at first bend 463. In anatomical terms, temporomandibular joint 466 is located inferior from ear canal 182. Temporomandibular joint 466 is shifted from ear canal 182 along the longitudinal body axis, e.g., along virtual plane 439 extending in parallel to the sagittal plane, toward a lower body region. Further, temporomandibular joint 466 is located medial from first bend 463 of ear canal 182. Temporomandibular joint 466 is shifted from first bend 463 of ear canal 182 along a transverse body axis, e.g., perpendicular to virtual plane 439, toward the sagittal plane. When earpiece housing 461 is implemented as earpiece housing 441, windows 444, 445 can be positioned at or close to the convex curvature 463 of ear canal wall 431 at the first bend. However, windows 444, 445 may then be oriented in a direction pointing away from temporomandibular joint 466. When earpiece housing 461 is implemented as earpiece housing 441, windows 444, 445 can be positioned closer to temporomandibular joint 466. However, windows 444, 445 may then be spaced from convex curvature 463 of ear canal wall 431 at the first bend.

In other examples, e.g., when earpiece housing 461 is configured to be inserted more deeply into ear canal 431, earpiece housing 461 may be configured such that concave curvature 447 faces a convex ear canal wall curvature at second bend 464. At second bend 246, as illustrated, ear canal wall 431 may have a convex curvature at a side of ear canal 182 opposing the side at which ear canal wall 431 has the convex curvature at first bend 463. In anatomical terms, the convex ear canal wall curvature at second bend 464 can be inferior relative to the convex ear canal wall curvature at first bend 463. Accordingly, earpiece housing 461 may be configured such that concave curvature 447 is positioned at the side of ear canal 182 opposing the side having the convex ear canal curvature at first bend 463. When earpiece housing 461 is implemented as earpiece housing 441, windows 444, 445 can thus be positioned at or close to the convex curvature of ear canal wall 431 at second bend 464 and at a position of ear canal 182 which is closest to temporomandibular joint 466 at second bend 464.

Figure 11:
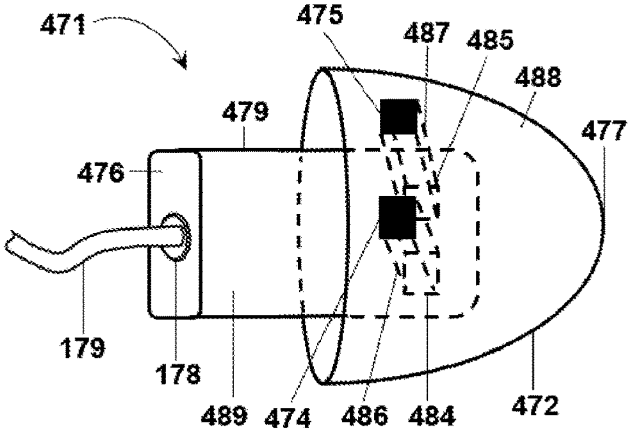

FIG. 11 illustrates another exemplary earpiece housing 471 which may be implemented as ITE housing 141, 241, 172, 421. Earpiece housing 471 comprises a receiver housing 479 and a flexible member 472 attached to receiver housing 479. Flexible member 472 is configured to conform to a shape of ear canal 182 when earpiece housing 471 is at least partially inserted into ear canal 182. Flexible member 472 comprises an outer surface 488 at least partially contacting ear canal wall 431 when earpiece housing 471 is at least partially inserted into ear canal 182. Flexible member 472 may thus be configured to provide for an acoustical sealing between the inner region of the ear canal and the ambient environment outside the ear. As illustrated, flexible member 472 may have a dome shape, or any other shape which may be suitable to facilitate an insertion of earpiece housing 471 into ear canal 182. For instance, flexible member 472 can be attached to receiver housing 479 at a front end 477 of earpiece housing 471 or to a lateral wall 489 of receiver housing 479. In the illustrated example, receiver housing 479 has an elongate form, e.g., a cylindrical form. Output transducer 147, 247 can be accommodated inside receiver housing 479. A sound outlet may be provided at front end 477 of earpiece housing 471. Cable 179 is connected to earpiece housing 471 via cable connector 178. For instance, as illustrated, cable connector 178 may be provided at a rear end 476 of earpiece housing 471, which may correspond to a rear end of receiver housing 479.

Light emission area 424 and light reception area 425 are implemented as a respective area 474, 475 on outer surface 488 of flexible member 472. For instance, flexible member 472 may be at least partially formed of a material transparent or translucent to light that can be emitted by light source 417 and is detectable by light detector 419. As another example, surface area 474, 475 of flexible member 472 may be implemented as a respective transparent or translucent window in flexible member 472, wherein flexible member 472 may be opaque to the light at other areas than surface area 474, 475. Light source 417 and light detector 419 can be included in receiver housing 479. For instance, light source 417 and/or light detector 419 can be provided at lateral wall 489, e.g., attached to lateral wall 489, in order to emit and/or detect the light at a respective area 484, 485 at lateral wall 489. As another example, light source 417 and/or light detector 419 can be accommodated inside receiver housing 479, wherein area 484, 485 at lateral wall 489 may be implemented as a respective window in lateral wall 489 through which light emitted by light source 417 and/or light detectable by light detector 419 can pass. As illustrated, light emission and detection area 484, 485 at receiver housing 479 may be connected to light emission and detection area 474, 475 at flexible member 472 via a respective light guide 485, 486. In other examples, light guides 485, 486 may be omitted such that the emitted and/or detectable light may be transmitted between light emission areas 474, 484 and light detection areas 475, 485 without being guided in between.

In some implementations, light emission area 424 and/or light reception area 425 is positioned at outer surface 488 of flexible member 472 such that area 424, 425 has a position, in anatomical terms, close to bend 447 relative to the transverse body axis when earpiece housing 471 is at least partially inserted into the ear canal, e.g., corresponding to areas 444, 445 of earpiece 441 described above. In some other implementations, light emission area 424 and/or light reception area 425 is positioned at outer surface 488 of flexible member 472 such that area 424, 425 has a position, in anatomical terms, which is medial relative to bend 447 when earpiece housing 471 is at least partially inserted into the ear canal, e.g., corresponding to areas 444, 445 of earpiece 451 described above.

Figure 12:
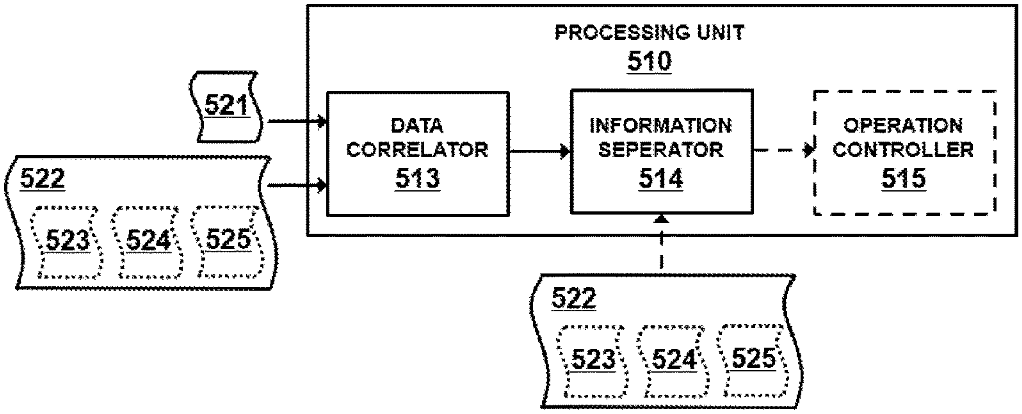
FIG. 12 schematically illustrates an exemplary algorithm of processing sensor data generated in the hearing device illustrated in FIG. 1.

FIG. 12 illustrates a functional block diagram of an exemplary sensor data processing algorithm that may be executed by a processing unit 510. For instance, processing unit 510 may comprise processor 125 of hearing device 110 and/or processor 225 of hearing device 210 and/or processor 325 of user device 310. As shown, the algorithm is configured to be applied to BTE housing movement data 521 indicative of movements of BTE housing 121, 171, 221, as provided by movement sensor 122, 222, and ear canal sensor data 522 provided by ear canal sensor 402 included in ITE housing 141, 241, 172, 421, which is affected by movements of ear canal wall 431. BTE housing movement data 521 and ear canal sensor data 522 can be received by processing unit 510. Ear canal sensor data 522 may comprise ITE housing movement data 523 and/or optical sensor data 524 and/or other sensor data 525.

The algorithm comprises a data correlation module 513 and an information separation module 514. The algorithm may further comprise an operation controlling module 515. BTE housing movement data 521 and at least part of ear canal sensor data 522, e.g., ITE housing movement data 523 and/or optical sensor data 524 and/or other sensor data 525, is inputted to data correlation module 513. Data correlation module 513 can determine a correlation between the inputted BTE housing movement data 521 and the inputted ear canal sensor data 522.

Information separation module 514 is configured to separate, based on the correlation determined by data correlation module 513, information about movements of the ear canal wall relative to BTE housing 121, 171, 221 from at least part of ear canal sensor data 522. In some implementations, the information may be separated from at least part of ear canal sensor data 522 inputted to data correlation module 513. In some implementations, at least part of ear canal sensor data 522 may be separately inputted to information separation module 514. In some instances, ear canal sensor data 522 separately inputted to information separation module 514 may be different and/or excluded from ear canal sensor data 522 for which the correlation with BTE housing movement data 521 has been determined by data correlation module 513. E.g., in at least one of ITE housing movement data 523, optical sensor data 524 and other sensor data 525, the information about movements of the ear canal wall relative to BTE housing 121, 171, 221 may be separated by information separation module 514 based on a correlation of at least one other of ITE housing movement data 523, optical sensor data 524 and other sensor data 525 with BTE housing movement data 521, as determined by data correlation module 513.

In some implementations, operation controlling module 515 is provided, which may be configured to control an operation depending on the correlation determined by data correlation module 513 and/or an operation which is employing the information separated by information separation module 514 and/or an operation which is employing ear canal sensor data 522 from which the information about movements of the ear canal wall relative to BTE housing 121, 171, 221 has been separated by information separation module 514. Some examples of operations that may be performed when controlled by operation controlling module 515 are described in the following description.

Figure 13:
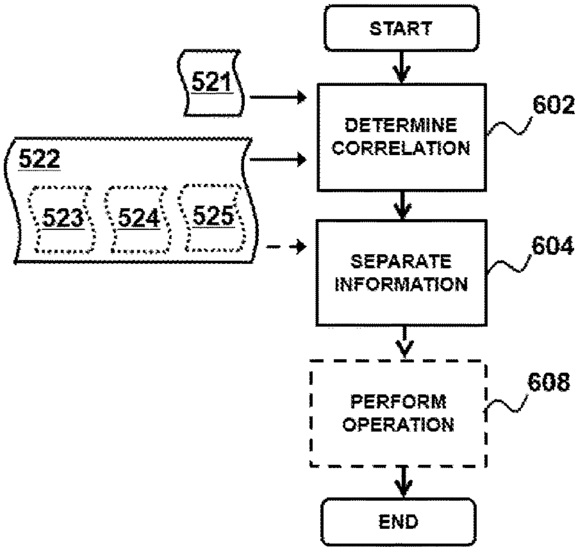
FIGS. 13-18 illustrate some exemplary methods of processing sensor data generated in the hearing device illustrated in FIG. 1 according to principles described herein.

FIG. 13 illustrates a block flow diagram for an exemplary method of processing sensor data generated in hearing device 110, 120. The method may be executed by processing unit 125, 225, 325, 510, for instance when executing the data processing algorithm illustrated in FIG. 6. At 602, a correlation between the BTE housing movement data 521 and at least part of ear canal sensor data 522 is determined. As illustrated, ear canal sensor data 522 may comprise ITE housing movement data 523 and/or optical sensor data 524 and/or other sensor data 525.

A correlation, as used herein, may be any relationship determined between BTE housing movement data 521 and at least part of ear canal sensor data 522. In particular, determining the correlation may comprise relating at least part of ear canal sensor data 522 to BTE housing movement data 521. In some examples, by determining the correlation, correlated data may be provided, the correlated data indicative of whether information in BTE housing movement data 521 and at least part of ear canal sensor data 522 is uncorrelated, e.g., unrelated, or correlated, e.g., related. For instance, determining the correlation may comprise determining a degree to which information in the BTE housing movement data 521 and information in the ear canal sensor data 522 is correlated. The degree of correlation may be representative of a degree to which BTE housing movement data 521 and ear canal sensor data 522 comprise information being related to each other and/or information varying in coordination with each other, e.g., dependently from one another. The degree of correlation may also be representative of a degree to which information in BTE housing movement data 521 and ear canal sensor data 522 exhibit a mutually related and/or corresponding and/or similar behavior, e.g., in a time domain and/or in a frequency domain.

To illustrate, BTE housing movement data 521 and ear canal sensor data 522 may be correlated by comparing information in BTE housing movement data 521 with information in the ear canal sensor data 522 and/or determining a difference in the information, e.g., by subtracting and/or adding at least part of the information, and/or relating the information with each other in other ways, e.g. by multiplying at least part of the information with each other and/or by determining a convolution of at least part of the information. In some examples, the degree of correlation may be determined based on the comparison and/or the difference and/or the other relationship which may have been determined. In some examples, BTE housing movement data 521 and ear canal sensor data 522 may be correlated by determining a similarity measure indicative of a similarity of the information contained in BTE housing movement data 521 relative to the information contained in ear canal sensor data 522, e.g., a cross-correlation. In some examples, BTE housing movement data 521 and ear canal sensor data 522 may be correlated by calculating a statistical value representative of the degree of correlation such as, e.g., a Pearson's Correlation Coefficient and/or Maximal Information Coefficient and/or Kullback-Leibler divergence.

In some examples, information in the BTE housing movement data 521 and information in the ear canal sensor data 522 may be correlated based on a prediction performed by a machine learning (ML) algorithm. E.g., the ML algorithm may be trained based on information collected from previous BTE housing movement data 521 and previous ear canal sensor data 522, which may be labelled as correlated or uncorrelated, or which may be labelled by a corresponding degree of correlation, during the training. The information may be collected from the user wearing hearing device 110, 210, e.g., during regular usage of the hearing device, or from a plurality of users wearing corresponding hearing devices 110, 210. For example, at least in an initial training phase, the information used for training the ML algorithm may be labelled based on any of the correlation techniques described above. For example, when training the ML algorithm and ear canal sensor data 522 comprises multiple sensor data 523, 524, 525 provided by different sensors 405, 407, 409 included in ear canal sensor 402, the correlation may be determined between at least one of the multiple sensor data 523, 524, 525 and the BTE housing movement data 521, e.g., based on at least one of the correlation techniques described above, which information may then be labelled accordingly for the training of the ML algorithm, and/or corresponding information in at least another one of the multiple sensor data 523, 524, 525, for which the correlation may not have been determined, may be labelled accordingly for the training of the ML algorithm.

In some implementations, information in BTE housing movement data 521 and information in at least part of ear canal sensor data 522 may be determined as correlated when a degree of correlation is above a threshold, and/or as uncorrelated when the degree of correlation is below the threshold. When information in BTE housing movement data 521 and at least part of ear canal sensor data 522 is determined as correlated, e.g., when the degree of correlation exceeds the threshold, the information in ear canal sensor data 522 may be regarded as being related to movements of BTE housing 121, 171, 221, e.g., as being caused by movements of ITE housing 141, 241, 172, 421 corresponding to movements of BTE housing 121, 171, 221, which may be related to movements of the user's cranium, e.g., when the user is turning his head or body or when the user is walking or running or changing his posture. When information in BTE housing movement data 521 and at least part of ear canal sensor data 522 is determined as uncorrelated, e.g., when the degree of correlation is below the threshold, the information in ear canal sensor data 522 may be regarded as being unrelated to movements of BTE housing 121, 171, 221, e.g., as being caused by movements of ITE housing 141, 241, 172, 421 relative to movements of BTE housing 121, 171, 221, which may be related to movements of the user's mandible different from movements of the user's cranium, e.g., when the user is talking or chewing or drinking or clenching his teeth, and/or which may be related to an own voice activity of the user.

In some implementations, separating information about movements of the ear canal wall relative to the BTE housing from at least part of the ear canal sensor data comprises separating information from at least part of the ear canal sensor data based on whether information in BTE housing movement data 521 and at least part of ear canal sensor data 522 is determined as uncorrelated, e.g., when a degree of correlation is determined below a threshold. Conversely, separating information about movements of the ear canal wall corresponding to movements of the BTE housing from at least part of the ear canal sensor data may comprise separating information from at least part of the ear canal sensor data based on whether information in BTE housing movement data 521 and at least part of ear canal sensor data 522 is determined as correlated, e.g., when a degree of correlation is determined above a threshold.

In some implementations, determining the correlation may comprise determining an attribute of the information in the BTE housing movement data 521 and at least part of ear canal sensor data 522 which has been determined as correlated and/or determining an attribute of the information in the BTE housing movement data 521 and at least part of ear canal sensor data 522 which has been determined as uncorrelated. For example, the attribute may comprise a feature occurring in the information in the BTE housing movement data 521 and at least part of the ear canal sensor data 522, e.g., a pattern and/or a peak and/or an amplitude, and/or a time and/or a frequency at which the information has been determined as correlated or uncorrelated. The attribute of information which has been determined as uncorrelated may be employed to separate information about movements of the ear canal wall relative to BTE housing 121, 171, 221 from at least part of ear canal sensor data 522, as further described below. In some instances, an attribute of information which has been determined as correlated may be employed to separate information about movements of the ear canal wall corresponding to movements of the BTE housing 121, 171, 221 from at least part of ear canal sensor data 522, as also described below.

In some implementations, the information about movements of the ear canal wall relative to BTE housing 121, 171, 221 is separated from at least part of ear canal sensor data 522 based on whether it has been determined as uncorrelated with BTE housing movement data 521 and/or information about movements of the ear canal wall corresponding to movements of BTE housing 121, 171, 221 is separated from at least part of ear canal sensor data 522 based on whether it has been determined as correlated with BTE housing movement data 521, in particular independently from an additionally determined attribute of the correlated or uncorrelated information. For example, correlated data resulting from determining the correlation may directly represent information about movements of the ear canal wall relative to the BTE housing, which has been separated from at least part of the ear canal sensor data based on said correlation. Those and other examples are also further described below.

In some implementations, when ear canal sensor data 522 comprises multiple sensor data 523, 524, 525 provided by different sensors 405, 407, 409 included in ear canal sensor 402, e.g., when ear canal sensor data 522 comprises at least two of ITE housing movement data 523, optical sensor data 524 and other sensor data 525, the correlation may be determined between BTE housing movement data 521 and the multiple sensor data 523, 524, 525. In some instances, determining the correlation between BTE housing movement data 521 and multiple sensor data 523, 524, 525 provided by different sensors 405, 407, 409 comprises determining a first correlation between BTE housing movement data 521 and one of sensor data 523, 524, 525 provided by one of sensors 405, 407, 409 to provide first correlated data, and determining a second correlation between another one of sensor data 523, 524, 525 provided by another one of sensors 405, 407, 409 and the first correlated data to provide second correlated data. The information about movements of the ear canal wall relative to BTE housing can be separated from at least part of ear canal sensor data 522 based on the second correlated data.

In some instances, determining the correlation between BTE housing movement data 521 and multiple sensor data 523, 524, 525 comprises determining a first correlation between BTE housing movement data 521 and one of sensor data 523, 524, 525 to provide first correlated data, and separately determining a second correlation between BTE housing movement data 521 and another one of sensor data 523, 524, 525 to provide second correlated data. The information about movements of the ear canal wall relative to BTE housing can be separated from at least part of ear canal sensor data 522 based on the first and/or second correlated data. In some instances, determining the correlation between BTE housing movement data 521 and multiple sensor data 523, 524, 525 comprises determining a first correlation between BTE housing movement data 521 and one of sensor data 523, 524, 525 to provide first correlated data, separately determining a second correlation between BTE housing movement data 521 and another one of sensor data 523, 524, 525 to provide second correlated data, and determining a third correlation between the first correlated data and the second correlated data to provide third correlated data. The information about movements of the ear canal wall relative to BTE housing can be separated from at least part of ear canal sensor data 522 based on the third correlated data.

Various other configurations of determining the correlation between BTE housing movement data 521 and multiple sensor data 523, 524, 525 are conceivable. E.g., in some implementations, a correlation between one of sensor data 523, 524, 525 and another one of sensor data 523, 524, 525 may additionally be taken into account when separating the information about movements of the ear canal wall relative to BTE housing 121, 171, 221 from at least part of ear canal sensor data 522.

At 604, based on the correlation determined at 602, information about movements of the ear canal wall relative to BTE housing 121, 171, 221 is separated from at least part of ear canal sensor data 522. For instance, separating the information may comprise removing and/or extracting and/or marking and/or identifying information about the ear canal wall movements relative to BTE housing 121, 171, 221 from and/or in at least part of ear canal sensor data 522. In particular, when information in BTE housing movement data 521 and at least part of ear canal sensor data 522 are determined as uncorrelated at 602, e.g., when a degree of correlation is determined below a threshold, the information may be separated from at least part of ear canal sensor data 522 at 604.

In some implementations, the information is separated from at least part of ear canal sensor data 522 which has been correlated with BTE housing movement data 521 at 602. In such a case, it may not be required to input at least part of ear canal sensor data 522 to information separation module 514 illustrated in FIG. 12. E.g., the separation may then be performed on at least part of ear canal sensor data 522 previously inputted to data correlation module 513. In some implementations, the information is separated from at least part of ear canal sensor data 522 which has not been correlated with BTE housing movement data 521 at 602. In such a case, as illustrated, at least part of ear canal sensor data 522 which has not been previously inputted to data correlation module 513 may be separately inputted to information separation module 514, e.g., without or in addition to at least part of ear canal sensor data 522 which has been previously inputted to data correlation module 513.

In some implementations, the information is separated from at least part of ear canal sensor data 522 based on an attribute of BTE housing movement data 521 and/or at least part of ear canal sensor data 522 for which the information has been determined as correlated or uncorrelated at 602. At 604, information to be separated from at least part of ear canal sensor data 522 may then be selected based on the attribute, e.g., by a filter and/or other selecting techniques. To illustrate, when the attribute has been determined at 602 from at least one of ITE housing movement data 523, optical sensor data 524, and other sensor data 525, the information to be separated may be selected at 604 from at least one other of ITE housing movement data 523, optical sensor data 524, and other sensor data 525 based on the attribute. In this way, by selecting the information based on the attribute, the correlated data provided at 602 can be related to at least part of ear canal sensor data 522 from which the information shall be separated at 604. Selecting the information to be separated based on the attribute may thus also be regarded as a correlation.

For example, when the attribute comprises a time and/or a frequency at which the information has been determined as correlated or uncorrelated at 602, information in at least part of ear canal sensor data 522 having a corresponding time and/or a frequency may be selected at 604 to be separated. As another example, when the attribute comprises a feature occurring in the information in the BTE housing movement data 521 and/or at least part of the ear canal sensor data 522 for which the information has been determined as correlated or uncorrelated at 602, information in at least part of ear canal sensor data 522 having a corresponding feature, e.g., within a predefined time window and/or frequency window, may be selected at 604 to be separated. As a further example, information to be separated from at least part of ear canal sensor data 522 may be selected at 604 based on a degree of correlation determined at 602 without an attribute of the correlated information. As a further example, correlating BTE housing movement data 521 and at least part of ear canal sensor data 522 at 602 involving a subtraction of information included therein may directly provide a separation of the information which may be directly used as an output at 604 without requiring a selection beforehand.

In some implementations, movement sensor 122 included in BTE housing 121, 171, 221 is insensitive with regard to bone conducted vibrations, which may be caused, for instance, by a voice activity of the user. E.g., BTE housing 121, 171, 221 and/or movement sensor 122 may be positioned at a distance to the user's skull bones from which the bone conducted vibrations may be undetectable and/or movement sensor 122 may be provided as a type of sensor which is non-sensitive to the bone conducted vibrations. In some implementations, movement sensor 122 included in BTE housing 121, 171, 221 is sensitive to the bone conducted vibrations. E.g., BTE housing 121, 171, 221 and/or movement sensor 122 may be provided at a position close to and/or in contact with the user's skull bones in order to detect the bone conducted vibrations. In some instances, the information about bone conducted vibrations in BTE housing movement data 521 may be disregarded when determining the correlation between BTE housing movement data 521 and at least part of ear canal sensor data 522 at 602. For example, the information about bone conducted vibrations may be removed from the BTE housing movement data 521, e.g., by applying a filter on BTE housing movement data 521, e.g., before determining the correlation at 602. In some instances, the information about bone conducted vibrations in BTE housing movement data 521 may be included when determining the correlation between BTE housing movement data 521 and at least part of ear canal sensor data at 602.

To illustrate, in the latter case, in which information about bone conducted vibrations in BTE housing movement data 521 may be included when determining said correlation, the bone conducted vibrations detected by movement sensor 122 included in BTE housing 121 may coincide with ear canal movements affecting at least part of ear canal sensor data 522 provided by ear canal sensor 142 included in ITE housing 141, 241, 172, 421. However, the effect may be more pronounced in information included in ear canal sensor data 522 as compared to information included in BTE housing movement data 521. E.g., an amplitude of the information related to the bone conducted vibrations may be larger in at least part of ear canal sensor data 522 as compared to BTE housing movement data 521. In some implementations, based on such a difference between the information in BTE housing movement data 521 and at least part of ear canal sensor data 522, the information may be determined as uncorrelated, or as having a small degree of correlation, at 602. In this way, the effect of bone conducted vibrations in BTE housing movement data 521 may be disregarded when determining the correlation at 602, and when separating the information at 604 depending thereon. In some other implementations, the information may be determined as correlated, or as having a large degree of correlation, at 602. In this way, the effect of bone conducted vibrations in BTE housing movement data 521 may be accounted for when determining the correlation at 602, and when separating the information at 604 depending thereon.

In some implementations, at 608, an operation can be performed, e.g., depending on the correlation determined at 602 and/or by employing the information separated at 604 and/or by employing at least part of ear canal sensor data 522 from which the information has been separated at 604. Some examples of such an operation are illustrated further below.

In some implementations, before determining the correlation at 602, the method further comprises monitoring BTE housing movement data 521, and controlling, depending on BTE housing movement data 521, ear canal sensor 402 to provide at least part of ear canal sensor data 522. For instance, ear canal sensor 402 may be controlled to provide at least part of ear canal sensor data 522 when the BTE housing movement 521 data is indicative of ear canal wall movements below or above a threshold. E.g., when ear canal sensor 402 comprises optical sensor 405, optical sensor 405 may be controlled to provide optical sensor data 524 only in such a case. In this way, an energy consumption of optical sensor 405 may be optimized and/or it can be ensured that the part of ear canal sensor data 522 from which the information shall be separated at 514 can be optimized for a desired application.

Figure 14:
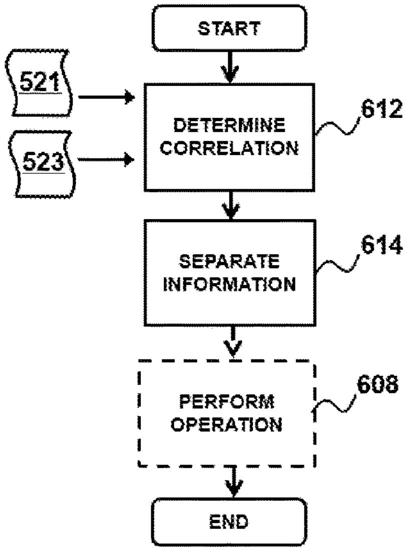

FIG. 14 illustrates a block flow diagram of some exemplary implementations of the method of processing sensor data illustrated in FIG. 13. At 612, BTE housing movement data 521 and ITE housing movement data 523 are received. The correlation is thus determined between BTE housing movement data 521 and ITE housing movement data 523. At 614, based on the correlation determined at 612, information about movements of the ear canal wall relative to BTE housing 121, 171, 221 is separated from ITE housing movement data 523.

In some implementations, the correlation is determined at 612 in a frequency domain. E.g., BTE housing movement data 521 and ITE housing movement data 523, which may be time dependent, may be transformed into the frequency domain before determining the correlation. In some implementations, determining the correlation at 612 comprises subtracting BTE housing movement data 521 from ITE housing movement data 523, or vice versa, e.g., in the frequency domain. The correlation data resulting from the subtraction can then be indicative of whether information in BTE housing movement data 521 and ITE housing movement data 523 is correlated or uncorrelated, and/or about a degree of correlation of the information. In this way, the correlation may be determined with a rather low computational effort.

In some implementations, separating information about movements of the ear canal wall relative to BTE housing 121, 171, 221 from ITE housing movement data 523 at 614 also comprises the subtracting performed at 612. E.g., the correlated data resulting from the subtraction at 612 may be directly employed at 614 as the separated information. In this way, also the separation may be determined with a low computational effort.

In some implementations, the correlated data resulting from the subtraction at 612 may again be subtracted from BTE housing movement data 521 and/or ITE housing movement data 523, e.g., at 612 or at 624. The data resulting from this second subtraction may then be employed as information about movements of ITE housing 141, 241, 172, 421 corresponding to movements of BTE housing 121, 171, 221.

Determining the correlation at 612 between BTE housing movement data 521 and ITE housing movement data 523 can be further beneficial in that sensor data 521, 523 can be rather easily correlated in a conclusive manner due to a similar and/or directly comparable information content as provided by a similar or corresponding sensor type 122, 222, 407. E.g., movement sensor 122, 222 included in BTE housing 121, 171, 221 and movement sensor 407 included in ITE housing 141, 241, 172, 421 may both be provided as an accelerometer. Thus, determining the correlation at 612 can be simplified and/or the determined correlation can be rather significant, e.g. in that it delivers conclusive results.

Some other implementations of the method illustrated in FIG. 13 may be represented by the block flow diagram illustrated in FIG. 14, wherein ITE housing movement data 523 is replaced by optical sensor data 524. Correspondingly, at 612, BTE housing movement data 521 and optical sensor data 524 are received. The correlation is thus determined between BTE housing movement data 521 and optical sensor data 524. At 614, based on the correlation determined at 612, information about movements of the ear canal wall relative to BTE housing 121, 171, 221 is separated from optical sensor data 524.

Determining the correlation at 612 between BTE housing movement data 521 and optical sensor data 524 can be beneficial in that the differing sensor types 122, 222, 407 may provide differing and/or complementary information correlated at 612. E.g., head movements may be more easily detectable by movement sensor 122, 222, whereas optical sensor 409 may be configured to provide information about ear canal wall movements caused by certain types of mandibular movements and/or own voice activities with a better resolution and/or sensitivity. As a result, also the information separated at 614 may contain enriched information as compared to the information contained in only one of sensor data 521, 524. The enriched information may be exploited, e.g., in an operation performed at 608 which is using the information separated at 604.

Figure 15:
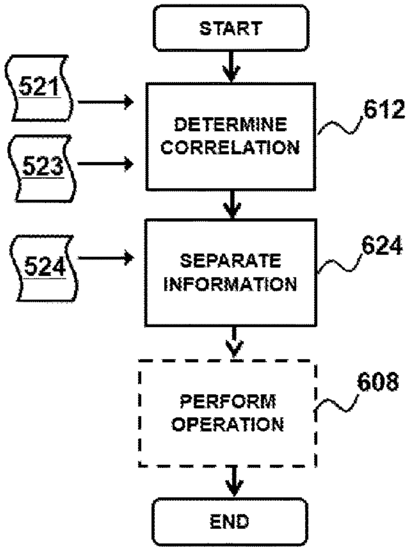

FIG. 15 illustrates a block flow diagram of some further exemplary implementations of the method of processing sensor data illustrated in FIG. 13. At 624, optical sensor data 524 is received. Further at 624, based on the correlation determined at 612 between BTE housing movement data 521 and ITE housing movement data 523, information about movements of the ear canal wall relative to BTE housing 121, 171, 221 is separated from optical sensor data 524.

In some implementations, at 624, the information is separated from optical sensor data 524 when corresponding information in BTE housing movement data 521 and ITE housing movement data 523, e.g., information with a corresponding attribute, is determined as uncorrelated at 612. In some implementations, when the correlation is determined in the frequency domain at 612, optical sensor data 524, which may be time dependent, may also be transformed into the frequency domain before separating, at 624, the information from optical sensor data 524. In particular, at least one frequency at which information in BTE housing movement data 521 and ITE housing movement data 523 is determined as uncorrelated or correlated at 612 may also be determined as an attribute of the information. E.g., the attribute of the information may be determined from BTE housing movement data 521 and ITE housing movement data 523 subtracted from each other in the frequency domain at 612. The attribute of the information can then be employed at 624 to select the information to be separated from optical sensor data 524 having the corresponding attribute.

To illustrate, a frequency at which information in BTE housing movement data 521 and ITE housing movement data 523 is determined as uncorrelated, e.g., based on BTE housing movement data 521 and ITE housing movement data 523 subtracted from each other having a value larger than zero or larger than another baseline value, may be regarded as a frequency representative of movements of the ear canal wall relative to BTE housing 121, 171, 221. Accordingly, the frequency may be selected correspondingly in optical sensor data 524 in order to separate information related to this frequency therefrom. In addition or instead of the at least one frequency, another attribute of the information determined at 612 as correlated or uncorrelated may be employed at 624 to select the information to be separated from optical sensor data 524, e.g., at least one time at which the information is determined as correlated or uncorrelated and/or at least one feature occurring in the information which has been determined as correlated or uncorrelated.

Figure 16:
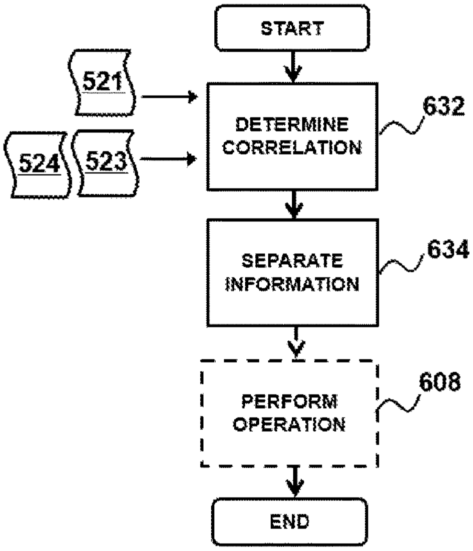

FIG. 16 illustrates a block flow diagram of some further exemplary implementations of the method of processing sensor data illustrated in FIG. 13. At 632, BTE housing movement data 521, ITE housing movement data 523, and optical sensor data 524 are received. The correlation is thus determined between BTE housing movement data 521, ITE housing movement data 523, and optical sensor data 524. At 634, based on the correlation determined at 632, information about movements of the ear canal wall relative to BTE housing 121, 171, 221 is separated from optical sensor data 524 and/or ITE housing movement data 523.

In some implementations, at 632, determining the correlation between BTE housing movement data 521, ITE housing movement data 523, and optical sensor data 524 comprises determining a first correlation between BTE housing movement data 521 and ITE housing movement data 523, and determining a second correlation between optical sensor data 524 and correlated data resulting from the first correlation between BTE housing movement data 521 and ITE housing movement data 523. E.g., BTE housing movement data 521 and ITE housing movement data 523 may be subtracted from each other, as described above, e.g., in a frequency domain, to provide the correlated data between BTE housing movement data 521 and ITE housing movement data 523. The correlation may thus at least partially performed in the frequency domain. The correlated data may then be correlated with optical sensor data 524, e.g., also in the frequency domain and/or in a time domain. The correlated data resulting from the first correlation between BTE housing movement data 521 and ITE housing movement data 523 may be denoted as first correlated data, and correlated data resulting from the second correlation between optical sensor data 524 and the first correlated data may be denoted as second correlated data. At 634, the information about movements of the ear canal wall relative to BTE housing 121, 171, 221 can then be separated from optical sensor data 524 based on the second correlated data. Alternatively or additionally, the information about movements of the ear canal wall relative to BTE housing 121, 171, 221 can be separated from ITE housing movement data 523 based on the first and/or second correlated data.

In some implementations, at 632, determining the correlation between BTE housing movement data 521, ITE housing movement data 523, and optical sensor data 524 comprises determining a first correlation between BTE housing movement data 521 and ITE housing movement data 523, and separately determining a second correlation between BTE housing movement data 521 and optical sensor data 524. At 634, the information about movements of the ear canal wall relative to BTE housing 121, 171, 221 can then be separated from optical sensor data 524 based on the second correlated data, e.g., by separating information from optical sensor data 524 which has been determined as uncorrelated at 632 in the second correlated data, or based on the first and second correlated data, e.g., by separating information from optical sensor data 524 which has been determined as uncorrelated at 632 in the second correlated data and which has an attribute of information that has been determined as uncorrelated at 632 in the first correlated data. Alternatively or additionally, at 634, the information about movements of the ear canal wall relative to BTE housing 121, 171, 221 can be separated from ITE housing movement data 523 based on the first correlated data, e.g., by separating information from ITE housing movement data 523 which has been determined as uncorrelated at 632 in the first correlated data, or based on the first and second correlated data, e.g., by separating information from ITE housing movement data 523 which has been determined as uncorrelated at 632 in the first correlated data and which has an attribute of information that has been determined as uncorrelated at 632 in the second correlated data.

In some implementations, at 632, determining the correlation between BTE housing movement data 521, ITE housing movement data 523, and optical sensor data 524 comprises determining a first correlation between BTE housing movement data 521 and ITE housing movement data 523, separately determining a second correlation between BTE housing movement data 521 and optical sensor data 524, and determining a third correlation between first correlation data resulting from the first correlation and second correlation data resulting from the second correlation. At 634, the information about movements of the ear canal wall relative to BTE housing 121, 171, 221 can then be separated from optical sensor data 524 based on the third correlated data resulting from the third correlation. Alternatively or additionally, the information about movements of the ear canal wall relative to BTE housing 121, 171, 221 can be separated from ITE housing movement data 523 based on the third correlated data. Various other configurations of determining the correlation between BTE housing movement data 521, ITE housing movement data 523, and optical sensor data 524 at 632 are conceivable.

Figure 17:
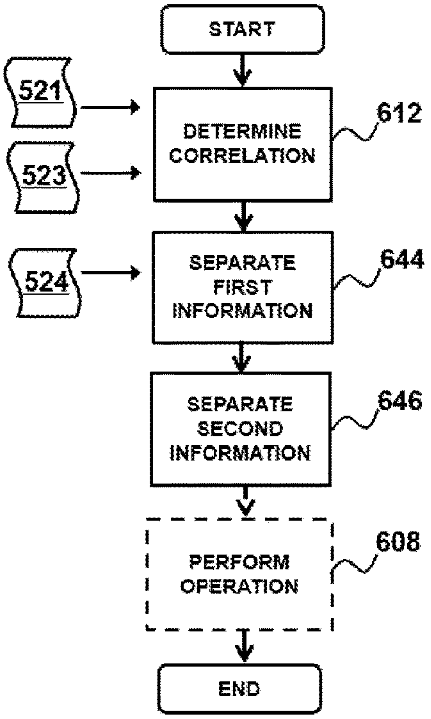

FIG. 17 illustrates a block flow diagram of some further exemplary implementations of the method of processing sensor data illustrated in FIG. 13. At 644, optical sensor data 524 is received. Further, at 644, based on the correlation determined at 612 between BTE housing movement data 521 and ITE housing movement data 523, first information is separated from optical sensor data 524. The first information is representative of information about movements of the ear canal wall relative to BTE housing 121, 171, 221. In particular, operation 644 may substantially correspond to operation 624 described above in conjunction with FIG. 15. At 646, second information is separated from optical sensor data 524. The second information is representative of information about movements of the ear canal wall corresponding to movements of BTE housing 121, 171, 221.

In some implementations, at 646, separating the information about movements of the ear canal wall corresponding to movements of BTE housing 121, 171, 221 is also based on the correlation between BTE housing movement data 521 and ITE housing movement data 523 determined at 612. For example, at 646, the information may be separated from optical sensor data 524 when corresponding information in BTE housing movement data 521 and ITE housing movement data 523, e.g., information with a corresponding attribute, is determined as correlated at 612. In some implementations, at 646, separating the information about movements of the ear canal wall corresponding to movements of BTE housing 121, 171, 221 is performed independently from the correlation between BTE housing movement data 521 and ITE housing movement data 523 determined at 612.

In some implementations, by separating, at 644, the first information from optical sensor data 524, and subsequently, at 646, separating the second information from optical sensor data 524, an advantageous removing, e.g., filtering, of movement artefacts from optical sensor data 524 can be realized. In particular, by splitting the separation of the movement artefacts into subsequent operations, in which separating the first information related to intrinsic ear canal wall movements is distinguished from separating the second information related to body and/or head movements, the movement artefacts can be separated from optical sensor data 524 in a more precise and/or reliable way.

In some implementations, operation 644 may be performed after operation 646.

Accordingly, at 646, optical sensor data 524 may be received and the second information may be separated from optical sensor data 524, and subsequently, based on the correlation determined at 612 between BTE housing movement data 521 and ITE housing movement data 523, the first information may be separated from optical sensor data 524. In this way, similar advantages may be achieved as described above.

Figure 18:
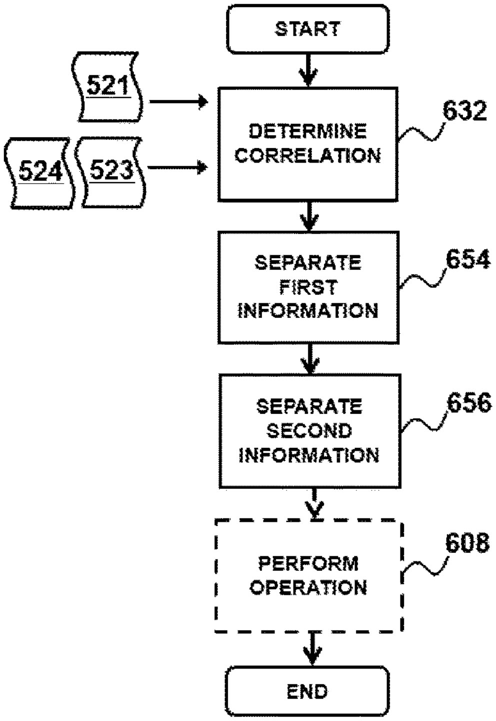

FIG. 18 illustrates a block flow diagram of some further exemplary implementations of the method of processing sensor data illustrated in FIG. 13. At 654, based on the correlation determined at 632 between BTE housing movement data 521, ITE housing movement data 523, and optical sensor data 524, the first information is separated from optical sensor data 524. In particular, operation 654 may substantially correspond to operation 634 described above in conjunction with FIG. 16. At 656, the second information is separated from optical sensor data 524, e.g., also based on the correlation determined at 632, or independently from the correlation determined at 632. In this way, similar advantages may be achieved as described above in conjunction with FIG. 17.

Some other implementations of the method illustrated in FIG. 13 may be represented by the block flow diagrams illustrated in FIGS. 15-18, wherein optical sensor data 524 is replaced by other sensor data 525, e.g., bioelectric sensor data. Some other implementations of the method illustrated in FIG. 13 may be represented by the block flow diagrams illustrated in FIG. 14, wherein ITE housing movement data 523 is replaced by other sensor data 525, e.g., bioelectric sensor data. This may have similar advantages as compared to when the ITE housing movement data 523 is replaced by optical sensor data 524, as described above in conjunction with FIG. 14.

Figure 19:
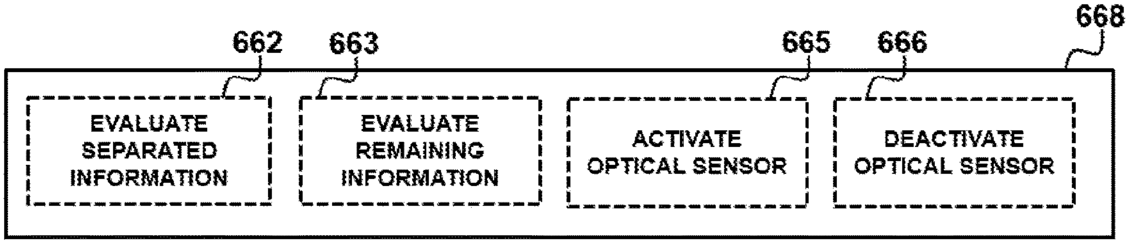
FIGS. 19-21 illustrate some exemplary operations that may be performed in any of the methods illustrated in FIGS. 13-18.

FIG. 19 illustrates an exemplary operation 668 of performing at least one operation 662, 663, 665, 666, which may be performed in place of operation 608 in some implementations of any of the methods illustrated in FIGS. 13-18. In particular, one or more operations 662-666 may be performed at 668, e.g., depending on and/or by employing the information separated from at least part of ear canal sensor data 522 at 604, 614, 624, 634, 644, 646, 654, 656 and/or by employing at least part of ear canal sensor data 522 from which the information has been separated.

At 662, the information separated from at least part of ear canal sensor data 522 at 604, 614, 624, 634, 644, 646, 654, 656 is evaluated. In particular, the information separated at 604, 614, 624, 634, 644, 654 can be indicative of movements of the ear canal wall relative to BTE housing 121, 171, 221 which is distinguished from ear canal movements corresponding to movements of the BTE housing 121, 171, 221. The separated information can thus be associated with movements of a jaw of the user, in particular movements of the user's mandible, and/or an own voice activity of the user. Jaw movements, also referred to as mandibular movements, may be related to a variety of activities of the user including, e.g., chewing, drinking, medication intake, teeth clenching, coughing, yawning, sneezing, teeth cleaning, speaking, singing, and hemming. An own voice activity of the user, such as speaking, can be produced by a vibration of the user's vocal cords, which may also involve mandibular movements, but may also occur, to a certain extent, with little or no mandibular movements.

Evaluating the separated information may include determining at least one characteristic of the separated information. For instance, the characteristic may include a frequency, e.g., a frequency composition and/or a peak frequency and/or a center frequency, of the separated information and/or an amplitude, e.g., an amplitude composition associated with a frequency composition, of the separated information and/or a duration and/or a variation of such a characteristic. Based on the determined characteristic, at least one parameter associated with a mandibular movement may be determined. Based on the parameter, one or more of the above mentioned activities associated with mandibular movements may be identified. The characteristic may also comprise a feature included in the separated information, e.g., a peak and/or an information pattern, which may be identified as being representative of one or more of those activities associated with the mandibular movement. In some implementations, an ML algorithm may be employed to identify such a characteristic and/or feature in the separated information and/or to predict one or more of the activities associated with the mandibular movements based on the separated information.

Differing sensor types 405, 407, 409 which may be implemented in ear canal sensor 402 can provide differing and/or complementary information about the ear canal movements, which can be employed during evaluating the separated information at 662. Accordingly, an appropriate sensor type 405, 407, 409 or combination thereof may be implemented in ear canal sensor 402 depending on an intended type of application, e.g., to provide the separated information with a desired information content which may be indicative of a rather specific activity of the user associated with the mandibular movements, or of a rather large plurality of different activities. E.g., depending on the application, ear canal sensor 402 may include movement sensor 407, or optical sensor 405, or both, and/or other sensor 409.

In some implementations, when evaluating the separated information with respect to chewing and/or teeth clenching, different movements or movement phases of the mandible relative to temporomandibular joint 466 may be taken into account. To illustrate, during chewing, usual movements of the mandible relative temporomandibular joint 466 include two lateral excursions, in particular to the left and to the right, and a forward excursion, also referred to as protrusion. Similar movement phases may be associated with teeth clenching, which may further include a rearward excursion, also referred to as retrusion. Other activities, e.g., drinking, medication intake, teeth cleaning, or yawning, may be identified based on more different movements of the mandible, e.g., a mandible movement corresponding to opening the mouth and a longer period of the mandible resting in this position. Other activities, e.g., speaking, may be identified based on other movement patterns of the mandible, e.g., a mandible movement corresponding to repeated opening and closing of the mouth at varying frequencies and/or an own voice activity of the user.

In some implementations, when identifying chewing and/or teeth clenching and/or other activities and/or distinguishing in between, identifying one or more of those movement phases and/or determining a duration and/or sequence and/or frequency thereof and/or distinguishing between those movement phases may be desirable. In such an application, implementing optical sensor 405 in ear canal sensor 402 may be beneficial, e.g., according to earpiece 441, 451, 471 described above in conjunction with FIGS. 8-11, which can offer a good resolution and/or sensitivity with regard to the mandibular movements relative to temporomandibular joint 466. In some implementations, movement sensor 407 may be additionally implemented in ear canal sensor 402, e.g., to provide complementary information in the separated information about the mandibular movements and/or to provide redundant information, e.g., for verification purposes.

In some implementations, movement sensor 407 may be implemented in ear canal sensor 402 for the purpose to provide the information about the mandibular movements in the separated information, in particular without additional information provided from another sensor 405, 409 implemented in ear canal sensor 402. Such an operation of movement sensor 407 included in ear canal sensor 402 can be rather energy-efficient, e.g., when a long term monitoring of the mandibular movements is desired, and/or may be employed to monitor a larger variety of activities associated with the mandibular movements and/or the own voice activity, and/or may be employed to provide preliminary information indicating an occurrence of such an activity based on which another sensor included in ear canal sensor

402, e.g., optical sensor 405 and/or other sensor 409, may be activated or deactivated, as further described below.

In some implementations, when evaluating the separated information, at least one parameter associated with an own voice activity be determined, e.g., by determining at least one characteristic of the separated information, as described above. The parameter associated with the own voice activity may be employed by a voice activity detector (VAD) and/or for keyword detection and/or for speech recognition. E.g., when determining a frequency and/or amplitude and/or feature of the separated information, it may be associated with a frequency and/or amplitude and/or feature of a sound and/or keyword and/or other speech content produced by the own voice activity. Corresponding ear canal wall movements may be detected by optical sensor 405 and/or movement sensor 407 and/or other sensor 409 included in ear canal sensor 402 to be provided in the separated information.

In some implementations, at least some of the above described activities may be monitored based on the separated information for a specific time period, e.g., for a predetermined time period such as at least one minute, hour, day, week, or month, or for a variable time period which may depend on the activity and/or duration of the activity performed by the user, e.g., a duration during which the user eats or speaks. For instance, a specific user behavior during the activity may be monitored and/or evaluated, e.g., a chewing behavior during eating and/or a teeth clenching during sleeping. As another example, a social behavior of the user may be monitored and/or evaluated based on determining a plurality of different activities, e.g., when and how often which kind of activities are performed.

In some implementations, at 662, the information separated at 646, 656 indicative of movements of the ear canal wall corresponding to BTE housing 121, 171, 221 is evaluated. The separated information can thus be associated with movements of a head, also referred to as cranial movements, and/or a body of the user. Those movements may also be related to a variety of activities of the user including, e.g., when the user is turning his head or body or when the user is walking or running or changing his posture. Identifying one or more of those activities may comprise determining at least one characteristic of the separated information, as described above. Separating at 604, 614, 624, 634, 644, 654, on the one hand, information indicative of movements of the ear canal wall relative to BTE housing 121, 171, 221, and, on the other hand, at 646, 656, information indicative of ear canal wall movements corresponding to movements of the BTE housing 121, 171, 221, can facilitate the identifying of those activities in each case. For instance, the identified activities may be accounted for when monitoring a specific user behavior and/or a social behavior of the user, as described above.

At 663, information included in at least part of ear canal sensor data 522 remaining from the information separated at 604, 614, 624, 634, 644, 646, 654, 656 is evaluated. In particular, by the separating of information related to movements of the ear canal wall relative to BTE housing 121, 171, 221 and/or corresponding to movements of the BTE housing 121, 171, 221, a signal quality of ear canal sensor data 522 may be improved, e.g., with regard to a desired information content of ear canal sensor data 522. For instance, the separated information may be removed, e.g., filtered, from at least part of ear canal sensor data 522, or the separated information may be marked in at least part of ear canal sensor data 522 before evaluating the remaining information.

In some implementations, optical sensor data 524 and/or other sensor data 525 is evaluated. After separating the information at 624 or at 634, a signal quality of optical sensor data 524 can be improved in that movement artefacts related to intrinsic ear canal movements are reduced or removed. In some applications, e.g., when the intrinsic ear canal movements contribute for the most part to a degrading of optical sensor data 524, a signal quality of optical sensor data 524 may be sufficient after separating the information at 624 or at 634 to evaluate the optical sensor data 524 with regard to the remaining information. To illustrate, in some optical sensor applications, when ITE housing 141, 241 is tightly fit into the ear canal, intrinsic ear canal movements may contribute to a larger disturbance of a desired signal as compared to head movements and/or body movements. In some applications, a signal quality of optical sensor data 524 may be further improved by also reducing or removing other movement artefacts, e.g., related to head movements and/or body movements. Separating the information related to intrinsic ear canal movements beforehand can facilitate and/or enhance a precision of the separating of the other movement artefacts.

In some implementations, after separating the information at 644 or at 654, a signal quality of optical sensor data 524 can be improved in that movement artefacts related to both intrinsic ear canal movements and cranial and body movements are reduced or removed. In this way, by the separating the movement artefacts in subsequent procedures, an advanced filtering technique may be realized as compared to, e.g., separating the movement artefacts in a single procedure without distinguishing between different movement impacts.

At 665, optical sensor 405 is activated depending on the information separated from at least part of ear canal sensor data 522 at 604, 614. In some implementations, e.g., when optical sensor 405 is mainly employed to provide information other than information about ear canal wall movements, optical sensor 405 is activated when the information separated at 604, 614 is indicative of ear canal wall movements below a threshold. To illustrate, when the ear canal wall movements are below the threshold optical sensor 405 may be operated such that movement artefacts in optical sensor data 524 are avoided or reduced. In some implementations, e.g., when optical sensor 405 is mainly employed to provide information about ear canal wall movements, optical sensor 405 is activated when the information separated at 604, 614 is indicative of ear canal wall movements above a threshold. To illustrate, when the ear canal wall movements are above the threshold optical sensor 405 may be operated to provide additional and/or complementary information about the ear canal wall movements. In both cases, an energy consumption of optical sensor 405 can be reduced in that the operation time is restricted with regard to desired measurement conditions. At the same time, when optical sensor 405 is deactivated, a long term monitoring of the ear canal wall movements can be performed by the information separated from ITE housing movement data 523, wherein movement sensor 407 may be continuously operated at a lower energy consumption.

At 666, optical sensor 405 is deactivated depending on the information separated from at least part of ear canal sensor data 522 at 624, 634, 646, 656. In some implementations, e.g., when optical sensor 405 is mainly employed to provide information other than information about ear canal wall movements, optical sensor 405 is deactivated when the information separated at 624, 634, 646, 656 is indicative of ear canal wall movements above a threshold. In some implementations, e.g., when optical sensor 405 is mainly employed to provide information about ear canal wall movements, optical sensor 405 is deactivated when the information separated at 624, 634, 646, 656 is indicative of ear canal wall movements below a threshold.

In some implementations, depending on whether optical sensor 405 is deactivated or activated, the method illustrated in FIG. 14 or one of the methods illustrated in FIGS. 15-18 is performed.

Figure 20:
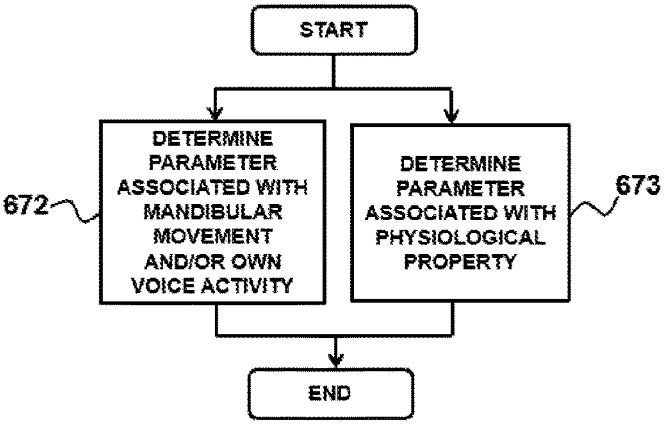

FIG. 20 illustrates a block flow diagram of another exemplary operation, which may be performed in place of operation 608 in some implementations of any of the methods illustrated in FIGS. 15-18, wherein optical sensor 405 is configured as a physiological sensor. In particular, optical sensor data 524 comprises physiological sensor data including information about blood flowing through tissue at the ear and may also be affected by movements of the ear canal wall. At 672, e.g., when optical sensor data 524 is evaluated, e.g., in accordance with operation 662 described above, a parameter associated with a mandibular movement and/or an own voice activity of the user is determined. E.g., at least one characteristic of the information separated at 624, 634, 646, 656 may be determined to determine the parameter. At 673, e.g., when optical sensor data 524 is evaluated in accordance with operation 663 described above, a parameter associated with a physiological property of the user is determined. E.g., the parameter may comprise a heart rate and/or a blood pressure and/or a heart rate variability (HRV) and/or an oxygen saturation index (SpO2) and/or a maximum rate of oxygen consumption (VO2max), and/or a concentration of an analyte contained in the tissue, such as water and/or glucose.

As illustrated, operations 672 and 673 may be performed at the same time, e.g., simultaneously, or at different times, e.g., alternatingly. For instance, when operations 672 and 673 are performed at different times, operation 672 may be performed when the separated information is indicative of ear canal wall movements above a first threshold, and operation 673 may be performed when the separated information is indicative of ear canal wall movements below a second threshold. The first and second threshold may be selected to be different or equal.

Figure 21:
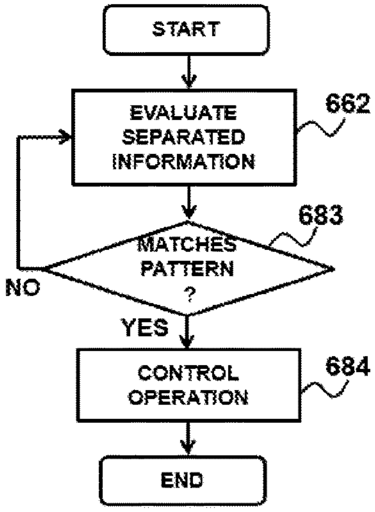

FIG. 21 illustrates a block flow diagram of another exemplary operation, which may be performed in place of operation 608 in some implementations of any of the methods illustrated in FIGS. 13-18. When evaluating the separated information at 662, it is determined, at 683, whether a parameter associated with a mandibular movement, e.g., as determined from the separated information at 662, is indicative of a movement pattern representative of an activity of a clenching of teeth by the user. The movement pattern is distinguished from other activities of teeth clenching by the user, e.g., such that a specific type of a teeth clenching activity performed by the user can be identified when the parameter associated with a mandibular movement is indicative of the movement pattern, e.g., when the parameter matches the pattern. To illustrate, different types of a teeth clenching activity may include a number and/or frequency and/or duration of teeth clenching and/or a specific pressure or pressure range applied by the jaw on the teeth during the teeth clenching and/or a clenching of teeth at a specific jaw position, e.g., only on the right side of the jaw, or only on the left side of the jaw, or on the right and left side of the jaw. When the parameter is indicative of the movement pattern, e.g., when the parameter matches the pattern, at 684, an operation of hearing device 110, 210 is controlled. For example, the operation may comprise adjusting an audio output, adjusting a parameter of an audio processing program, toggling between different programs, accepting or declining a phone call, and/or the like.

In this way, the user can be enabled to control an operation of hearing device 110, 210 by according mandibular movements. In some instances, it may be determined whether the separated information associated with mandibular movements matches a predetermined pattern representative of a repeated clenching of teeth, e.g., a predetermined number and/or frequency of teeth clenching. In some instances, it may be determined whether the separated information associated with mandibular movements matches a predetermined pattern representative of a clenching of teeth at a specific jaw position, e.g., only on the right side of the jaw, or only on the left side of the jaw, or on the right and left side of the jaw. In the latter case, hearing system 200 illustrated in FIG. 2 may be employed, wherein first and second hearing device 110, 210 may be worn at the left and right ear. The information about the ear canal wall movements relative to BTE housing 121, 221 may then be separated at 604, 614, 624, 634, 644, 646, 654, 656 from each ear canal sensor data 522 provided by respective ear canal sensor 142, 242 in order to identify the teeth clenching on the left side or right side or both. To illustrate, a double teeth clenching of the user may indicate accepting of a phone call, and a triple teeth clenching may indicate declining of the phone call. A continuous teeth clenching only on the left side of the jaw may indicate a volume decrease, and a continuous teeth clenching only on the right side of the jaw may indicate a volume increase.

While the principles of the disclosure have been described above in connection with specific devices, systems, and methods, it is to be clearly understood that this description is made only by way of example and not as limitation on the scope of the invention. The above described embodiments are intended to illustrate the principles of the invention, but not to limit the scope of the invention. Various other embodiments and modifications to those embodiments may be made by those skilled in the art without departing from the scope of the present invention that is solely defined by the claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

What is claimed is:

1. A method of processing sensor data generated in a hearing device, the hearing device comprising a BTE housing configured to be worn behind an ear of a user and an ITE housing configured to be at least partially inserted into an ear canal of the ear, the method comprising:

receiving, from a movement sensor included in the BTE housing, BTE housing movement data indicative of movements of the BTE housing;

receiving, from an ear canal sensor included in the ITE housing, ear canal sensor data affected by movements of an ear canal wall, characterized by determining a correlation between the BTE housing movement data and at least part of the ear canal sensor data; and separating, based on the correlation, information about movements of the ear canal wall relative to the BTE housing from at least part of the ear canal sensor data.

2. The method according to claim 1, wherein the ear canal sensor comprises a physiological sensor configured to provide physiological sensor data indicative of a physiological property of the user, wherein the information about ear canal wall movements relative to the BTE housing is separated from the physiological sensor data.

3. The method according to claim 2, further comprising evaluating, after the separating of the information about movements of the ear canal wall relative to the BTE housing, the physiological sensor data to determine a parameter associated with the physiological property of the user.

4. The method according to claim 3, wherein the ear canal sensor comprises an optical sensor configured to provide at least part of the ear canal sensor data as optical sensor data, the optical sensor comprising a light source configured to emit light toward the ear canal wall and a light detector configured to detect a reflected and/or scattered part of the light, the optical sensor data indicative of the detected light.

5. The method according to claim 4, wherein the physiological sensor comprises the optical sensor configured to emit the light at a wavelength absorbable by an analyte contained in blood such that the physiological sensor data included in the optical sensor data comprises information about the blood flowing through tissue at the ear.

6. The method according to claim 1, wherein the movement sensor is a first movement sensor and the ear canal sensor comprises a second movement sensor configured to provide at least part of the ear canal sensor data as ITE housing movement data indicative of movements of the ITE housing, wherein the correlation comprises a correlation determined between the BTE housing movement data and the ITE housing movement data.

7. The method according to claim 1, further comprising, after or before the separating of information about ear canal wall movements relative to the BTE housing, separating information about ear canal wall movements corresponding to the movements of the BTE housing from at least part of the ear canal sensor data.

8. The method according to claim 1, wherein the correlation is at least partially determined in a frequency domain.

9. The method according to claim 1, wherein the separating of information about ear canal wall movements relative to the BTE housing from at least part of the ear canal sensor data comprises at least one of removing the information about ear canal wall movements relative to the BTE housing from at least part of the ear canal sensor data;

extracting the information about ear canal wall movements relative to the BTE housing from at least part of the ear canal sensor data;

marking the information about ear canal wall movements relative to the BTE housing in at least part of the ear canal sensor data; and identifying the information about ear canal wall movements relative to the BTE housing in at least part of the ear canal sensor data.

10. The method according to claim 1, further comprising evaluating the separated information about movements of the ear canal wall relative to the BTE housing to determine a parameter associated with a mandibular movement and/or an own voice activity of the user.

11. The method according to claim 10, further comprising identifying, based on the parameter associated with the mandibular movement, a chewing and/or a clenching of teeth and/or a coughing and/or a yawning and/or a hemming and/or an intake of food and/or a fluid and/or a medication and/or a teeth cleaning activity by the user.

12. The method according to claim 10, further comprising determining whether the parameter associated with the mandibular movement is indicative of a movement pattern representative of an activity of a clenching of teeth by the user which is distinguished from other activities of teeth clenching by the user; and controlling, when the parameter is indicative of the movement pattern, an operation of the hearing device.

13. The method according to claim 1, further comprising monitoring the BTE housing movement data; and controlling, depending on the BTE housing movement data, the ear canal sensor to provide at least part of the ear canal sensor data.

14. A hearing device comprising a BTE housing configured to be worn behind an ear of a user;

an ITE housing configured to be at least partially inserted into an ear canal of the ear;

a movement sensor included in the BTE housing, the movement sensor configured to provide BTE housing movement data indicative of movements of the BTE housing;

an ear canal sensor included in the ITE housing, the ear canal sensor configured to provide ear canal sensor data affected by movements of an ear canal wall; and a processing unit configured to receive the BTE housing movement data and the ear canal sensor data, characterized in that the processing unit is configured to determine a correlation between the BTE housing movement data and at least part of the ear canal sensor data; and to separate, based on the correlation, information about movements of the ear canal wall relative to the BTE housing from at least part of the ear canal sensor data.

15. A hearing system comprising a hearing device configured to be worn at an ear of a user and a second hearing device configured to be worn at a second ear of the user and/or a user device portable by the user, the second hearing device and/or the user device communicatively coupled to the hearing device, the hearing device comprising a BTE housing configured to be worn behind the ear;

an ITE housing configured to be at least partially inserted into an ear canal of the ear;

a movement sensor included in the BTE housing, the movement sensor configured to provide BTE housing movement data indicative of movements of the BTE housing; and an ear canal sensor included in the ITE housing, the ear canal sensor configured to provide ear canal sensor data affected by movements of an ear canal wall, the hearing system further comprising a processing unit included in the hearing device and/or the second hearing device and/or the user device, the processing unit configured to receive the BTE housing movement data and the ear canal sensor data, characterized in that the processing unit is configured to determine a correlation between the BTE housing movement data and at least part of the ear canal sensor data; and to separate, based on the correlation, information about movements of the ear canal wall relative to the BTE housing from at least part of the ear canal sensor data.

* * * * *